(12) United States Patent
Lee et al.

(10) Patent No.: US 8,369,674 B2
(45) Date of Patent: Feb. 5, 2013

(54) OPTIMIZING TOTAL INTERNAL REFLECTION MULTILAYER OPTICS THROUGH MATERIAL SELECTION

(75) Inventors: Susanne Madeline Lee, Cohoes, NY (US); Peter Michael Edic, Albany, NY (US)

(73) Assignee: General Electric Company, Niskayuna, NY (US)

( * ) Notice: Subject to any disclaimer, the term of this patent is extended or adjusted under 35 U.S.C. 154(b) by 584 days.

(21) Appl. No.: 12/469,121

(22) Filed: May 20, 2009

(65) Prior Publication Data

US 2010/0296171 A1 Nov. 25, 2010

(51) Int. Cl.
*G02B 6/028* (2006.01)
*G02B 6/34* (2006.01)
*G02B 6/10* (2006.01)

(52) U.S. Cl. ........... 385/124; 385/32; 385/37; 385/127; 385/131

(58) Field of Classification Search .................... 385/131
See application file for complete search history.

(56) References Cited

U.S. PATENT DOCUMENTS

| | | | |
|---|---|---|---|
| 4,525,853 A | 6/1985 | Keem et al. | |
| 4,714,308 A | 12/1987 | Sawamura et al. | |
| H1436 H * | 5/1995 | Kersey et al. | 356/477 |
| 5,570,408 A | 10/1996 | Gibson | |
| 5,604,353 A | 2/1997 | Gibson et al. | |
| 6,157,765 A * | 12/2000 | Bruce et al. | 385/129 |
| 6,269,145 B1 | 7/2001 | Piestrup et al. | |
| 6,881,965 B2 | 4/2005 | Bowen et al. | |
| 6,959,022 B2 * | 10/2005 | Sandrock et al. | 372/6 |
| 7,366,374 B1 * | 4/2008 | Lee et al. | 385/31 |
| 7,412,131 B2 | 8/2008 | Lee et al. | |
| 2002/0021879 A1 * | 2/2002 | Lee et al. | 385/129 |
| 2003/0016907 A1 * | 1/2003 | LoCascio et al. | 385/27 |
| 2003/0077036 A1 | 4/2003 | Tanaka et al. | |
| 2003/0174978 A1 * | 9/2003 | Veligdan | 385/120 |
| 2004/0223715 A1 * | 11/2004 | Benoit et al. | 385/123 |
| 2005/0233246 A1 * | 10/2005 | Boden et al. | 430/270.11 |
| 2006/0204706 A1 * | 9/2006 | Horie et al. | 428/64.4 |
| 2008/0130129 A1 * | 6/2008 | Boden et al. | 359/652 |
| 2009/0046979 A1 * | 2/2009 | Zhou et al. | 385/43 |

FOREIGN PATENT DOCUMENTS

| | | |
|---|---|---|
| EP | 0821254 A1 | 1/1998 |
| EP | 0939467 A2 | 9/1999 |
| EP | 1308717 A1 | 5/2003 |
| EP | 1965229 A2 | 8/2008 |
| JP | 11160236 A * | 6/1999 |

(Continued)

OTHER PUBLICATIONS

Jurgen R. Meyer-Arendt, 4th Edition of Introduction to Classical and Modern Optics, pp. 10-14, 1995.*

(Continued)

*Primary Examiner* — Michelle R Connelly
(74) *Attorney, Agent, or Firm* — Scott J. Asmus

(57) ABSTRACT

An optic device includes a multilayer zone forming a redirection section for redirecting and transmitting photons through total internal reflection, each multilayer zone including a high index material having a first real refractive index $n_1$ and a first absorption coefficient $\beta_1$, a low index material having a second real refractive index $n_2$ and a second absorption coefficient $\beta_2$, and a grading zone disposed between the high index material and the low index material and including a grading layer having a third real refractive index $n_3$ and a third absorption coefficient $\beta_3$, wherein $n_1 > n_3 > n_2$.

39 Claims, 24 Drawing Sheets

FOREIGN PATENT DOCUMENTS

WO     WO2009076111 A2     6/2009

OTHER PUBLICATIONS

Optical Fiber Tutorial for Communication Fibers available on-line at http://www.fiberoptics4sale.com/Merchant2/optical-fiber.php, pp. 1-8, Jul. 2007.*

Kortright et al., "Multilayer Optical Elements for Generation and Analysis of Circularly Polarized X-Rays", Nuclear Instruments and Methods in Physics Research A291, (1990) 272-277.

Shields et al., "Overview of Polycapillary X-ray Optics", Power Diffr., vol. 17, Issue 2, pp. 1 (Jun. 2002).

PCT International Search Report dated Dec. 30, 2010 and Written Opinion.

* cited by examiner

OPTIMIZING TOTAL INTERNAL REFLECTION MULTILAYER OPTICS THROUGH MATERIAL SELECTION

BACKGROUND OF THE INVENTION

The subject matter disclosed herein generally relates to optics and, in particular, to multilayer optic devices.

Many imaging applications using photon radiation, such as x-ray radiation, require ever-increasing levels of flux. Increasing x-ray flux may be accomplished, for example, by focusing x-ray radiation emitted by an x-ray source. X-rays can be focused by reflecting an incident x-ray beam 10 from an interface 12 using total internal reflection, as shown in FIG. 1. The interface 12 can be formed between a first material medium 14, typically air, and a second material medium 16, typically a solid. In the illustration, the first material medium 14 has $n_{14}$ as the real part of its refractive index, and the second material medium 16 has $n_{16}$ as the real part of its refractive index. Total internal reflection can be realized if $n_{16} < n_{14}$, and if the angle the incident x-ray 10 makes with the interface 12 is smaller than the critical angle $\theta_{CR}$ specified for total internal reflection.

The critical angle $\theta_{CR}$ is determined by the refractive indices of the material media 14 and 16 and the energy of the photons in the incident x-ray beam 10. Generally, the refractive index 'n' of matter at x-ray energies can be expressed as $n = 1 - \delta + i\beta$ where the term $(1-\delta)$ is the real part of the refractive index and the parameter $\beta$ is related to the absorption coefficient of the corresponding material. At x-ray energies, the real part of the refractive index is very close to unity and is therefore usually expressed in terms of its decrement $\delta$ from unity, with $\delta$ typically on the order of $10^{-6}$ or smaller. At visible wavelengths, the critical angle $\theta_{CR}$ is largest when the difference between the real part of the refractive indices $(n_{14} - n_{16})$ or $(\delta_{16} - \delta_{14})$ is at a maximum for a given photon energy.

The critical angle $\theta_{CR}$ for 12.4 keV x-ray radiation incident on an aluminum mirror, for example, is less than 2.7 mrad (approximately 0.15 degree). Thus, to redirect an incident x-ray beam 10 having a beam width 'w' of five millimeters, for example, an uncoated planar aluminum mirror having an interface surface 22 length 'L' of at least 185 cm would be required, as shown in the illustration. The conventional method of selecting materials solely on the basis of the material indices of refraction produces only modest gains in reflectivity.

The current invention recognizes the need for a reflective multilayer configuration that provides for photon reflectivity at increased critical angles at ultraviolet-ray, x-ray, gamma-ray energies, and for higher gamma-ray energies than has heretofore been realized, and which provides for radiation collection over larger source solid angles than has heretofore been achieved.

BRIEF DESCRIPTION OF THE INVENTION

In one aspect of the invention, an optic device comprises at least a first multilayer zone forming a redirection section for redirecting and transmitting photons through total internal reflection, each multilayer zone including a high index material having a first real refractive index $n_1$ and a first absorption coefficient $\beta_1$, a low index material having a second real refractive index $n_2$ and a second absorption coefficient $\beta_2$, and a grading zone disposed between the high index material and the low index material and including a grading layer having a third real refractive index $n_3$ and a third absorption coefficient $\beta_3$, wherein $n_1 > n_3 > n_2$.

In another aspect of the invention, an optic device comprises one or more multilayer zones forming a first redirection section for redirecting and transmitting photons through total internal reflection, each multilayer zone including: a core formed from one of a high index material and a low-index material, the high index material having a first real refractive index $n_1$ and a first absorption coefficient $\beta_1$, the low index material having a second real refractive index $n_2$ and a second absorption coefficient $\beta_1$; a grading zone deposited on the core and including a grading layer having a third real refractive index $n_3$ and a third absorption coefficient $\beta_3$, wherein $n_1 > n_3 > n_2$; and an outer layer deposited on the grading zone and formed from the other of the high index material and the low-index material.

In still another aspect of the invention, a method for fabricating an optic device comprises: forming a high index layer of material having a first real refractive index $n_1$ and a first absorption coefficient $\beta_1$; forming a low index layer of material having a second real refractive index $n_2$ smaller than the first real refractive index $n_1$ and a second absorption coefficient $\beta_2$ larger than the first absorption coefficient $\beta_1$; and forming a grading zone between the low-index layer and the high-index layer, the grading zone including a grading material having a third real refractive index $n_3$ and a third absorption coefficient $\beta_3$, such that $n_1 > n_3 > n_2$, and the layers transmit and redirect photons through total internal reflection.

Other systems and/or methods according to the embodiments will become, or are apparent to one with skill in the art upon review of the following drawings and detailed description. It is intended that all such additional systems and methods be within the scope of the present invention, and be protected by the accompanying claims.

DETAILED DESCRIPTION OF THE INVENTION

This invention describes a multilayer optic device suitable for redirecting ultraviolet (UV)-ray, x-ray, or gamma-ray radiation. The multilayers of the optic device are arranged according to refractive indices such that the real parts of the refractive indices of the multilayer materials are graded generally from a high value to a low value within the optic device. For improved reflectivity, the photon absorption differences also are generally minimized between adjacent multilayer materials. For the purpose of this disclosure, a first layer is considered adjacent to a second layer when there are no other materials interposed between the first and second layers that have a real refractive index or a coefficient of absorption that are different from the respective real refractive indices or coefficients of absorption of the first and second layers.

In the method and device disclosed herein, a minimum of three different materials is used in a multilayer stack to obtain increased total internal reflection over current practice by maximizing the difference in real refractive indices between successive layers, with real refractive index decreasing in successive layers. In an embodiment that provides even greater total internal reflection, the photon absorption change between successive layers is simultaneously minimized with the maximization in real refractive index between successive layers. Additionally, each successive layer has higher photon absorption properties, while the real refractive index decreases monotonically from layer to layer. These criteria provide for more gradual changes in real refractive index and photon absorption properties than in current reflective x-ray optics materials.

Figure 1:
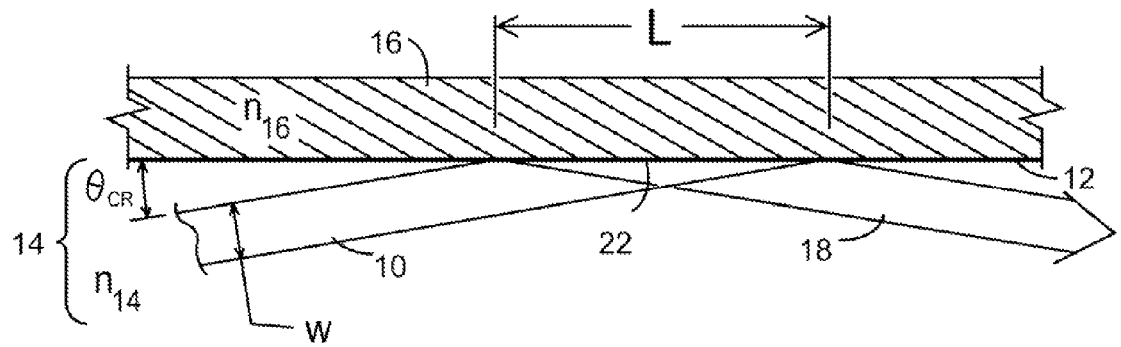
FIG. 1 shows an incident x-ray beam totally internally reflected from an interface, in accordance with the prior art.
Figure 2:
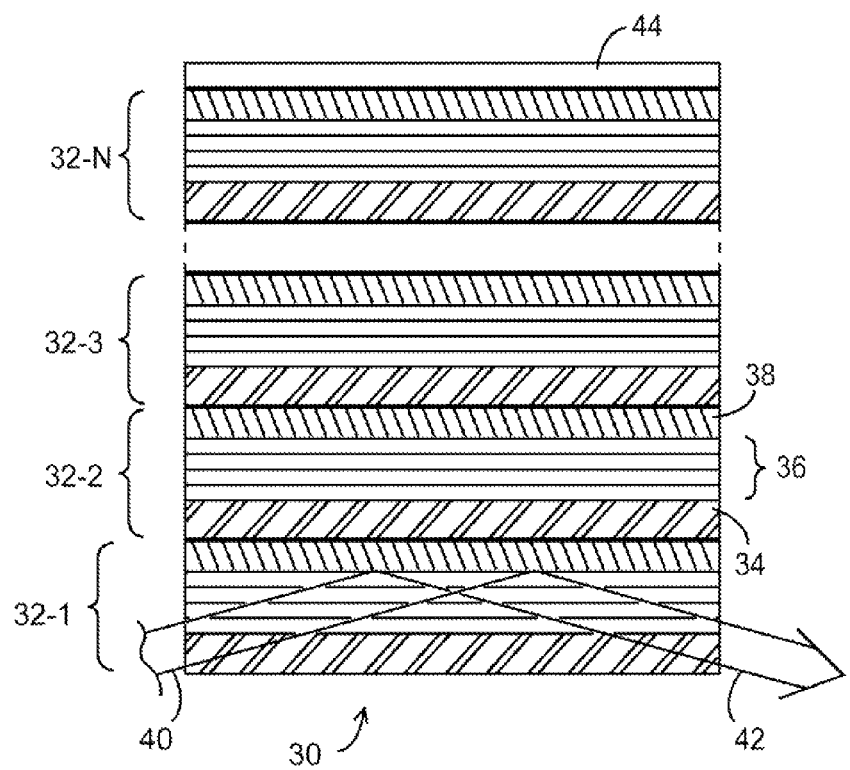
FIG. 2 is a diagrammatical cross-sectional illustration of an exemplary embodiment of a multilayer material stack adapted for use in redirecting an incident ultraviolet ray, x-ray, or gamma-ray beam through total internal reflection, in accordance with an embodiment of the invention.

FIG. 2 is a diagrammatical cross-sectional illustration of a multilayer material stack 30 (not drawn to scale) such as may be adapted for use in redirecting an incident photon beam 40 through total internal reflection as a reflected photon beam 42, where the incident photon beam 40 may comprise a UV beam, an x-ray beam, or a gamma-ray beam. As described in greater detail below, the reflected photon beam 42 may form a substantially collimated, divergent, or convergent photon beam from a substantially divergent, collimated, or convergent input photon beam. The multilayer material stack 30 comprises a plurality of multilayer zones, here represented by a first multilayer zone 32-1 through an N-th multilayer zone 32-N.

It should be understood that the number of multilayer zones comprising the multilayer material stack 30 are not limited in any way but is rather a function of the particular application for which the multilayer material stack 30 is configured. The multilayer material stack 30 may comprise hundreds or thousands of multilayer zones. Each multilayer zone 32-1 through 32-N includes a high-index layer 34, a low-index layer 38, and a grading zone 36 with one or more grading layers disposed between the high-index layer 34 and the low-index layer 38. The material layers making up each multilayer zone are selected and arranged in accordance with methods described herein. The multilayer material stack 30 may also comprise a photon-opaque cladding layer 44 at an outer surface of the multilayer material stack 30 to prevent the emission of photon radiation from the N-th multilayer zone 32-N.

It should be understood that the width of the incident photon beam 40 may be smaller or greater than the thickness of the first multilayer zone 32-1. When it is greater, different parts of the incident photon beam 40 pass through and are totally internally reflected by some or all of the other multilayer zones 32-2 through 32-N so as to emerge from the multilayer material stack 30 as corresponding parts of the reflected photon beam 42. When the incident photon beam 40 is smaller than the thickness of the first multilayer zone 32-1, the multilayer material stack 30 may produce smaller flux gains but can provide useful redirection capabilities.

For clarity of illustration, only the part of the incident photon beam 40 that enters and is reflected by the first multilayer zone 32-1 is shown. As explained in greater detail below, the materials selected for the various material layers have reflective properties such that photon total internal reflectivity is maximized for each of the multilayer zones 32-2 through 32-N. Moreover, the disclosed configuration results in a larger total internal reflection critical angle for UV rays, x rays, and gamma rays than has heretofore been realized in the relevant art.

Figure 3:
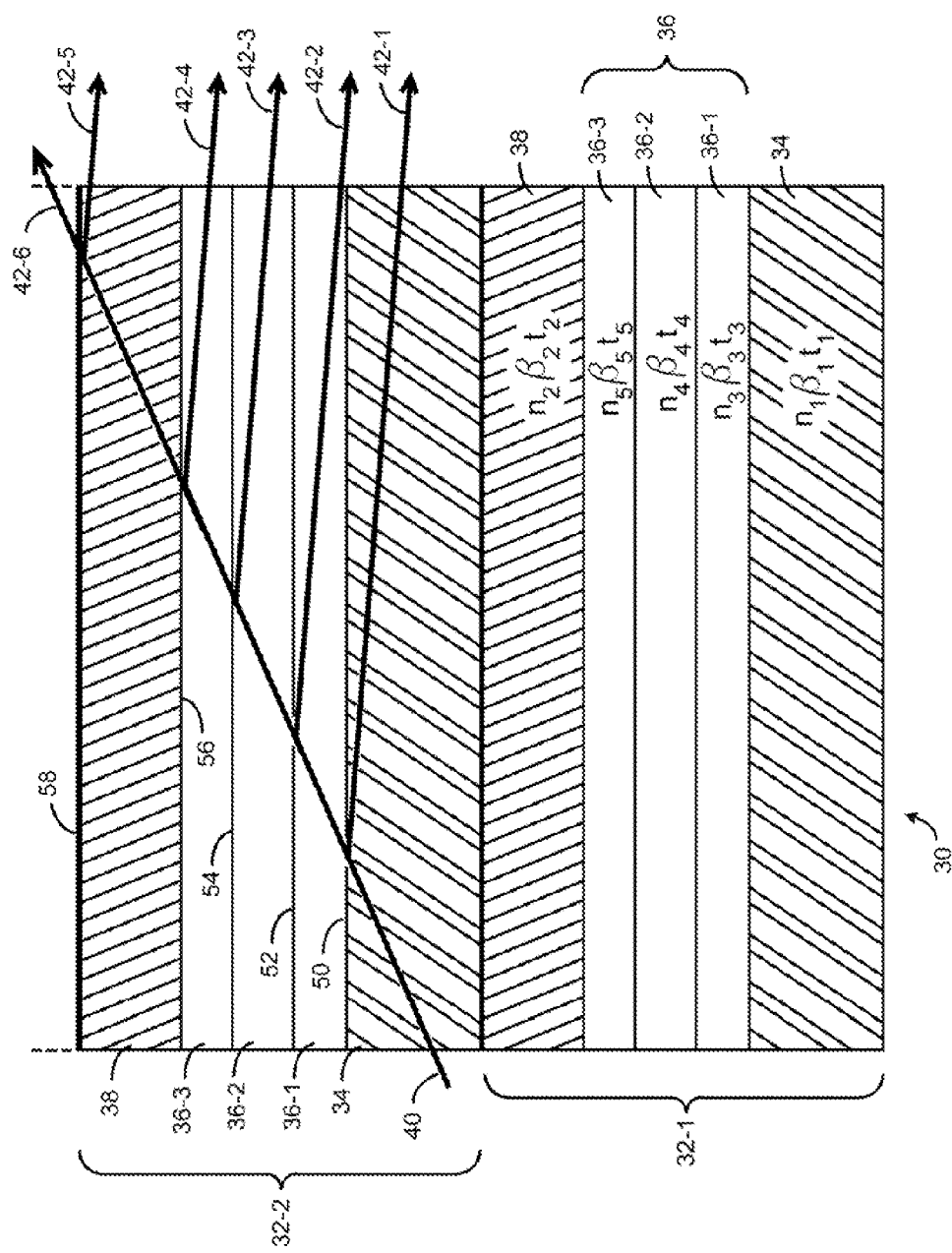
FIG. 3 is a detail cross-sectional view of first and second multilayer zones in the multilayer material stack of FIG. 2, each multilayer zone having a grading zone deposited on a high-index material layer.

Referring now to FIG. 3, in which only the first and second multilayer zones 32-1 and 32-2 are shown, each multilayer zone comprises multiple layers of materials, each layer of material having a unique real refractive index n, an absorption coefficient β, and a thickness t. In the example provided, the multilayer zones 32-1 and 32-2 each include: (i) the high-index layer 34 with a real refractive index $n_1$, an absorption coefficient $\beta_1$, and a thickness $t_1$; (ii) the grading zone 36 with a plurality of grading layers, here represented by grading layers 36-1 through 36-3, and (iii) the low-index layer 38 with a real refractive index $n_2$, an absorption coefficient $\beta_2$, and a thickness $t_2$, disposed on the grading zone 36.

The material forming the first grading layer 36-1 has a real refractive index $n_3$, an absorption coefficient $\beta_3$, and a thickness $t_3$, disposed on the high-index layer 34. The material forming the second grading layer 36-2 has a real refractive index $n_4$, an absorption coefficient $\beta_4$, and a thickness $t_4$, disposed on the first grading layer 36-1, and the material forming the third grading layer 36-3 has a real refractive index $n_5$, an absorption coefficient $\beta_5$, and a thickness $t_5$, disposed on the second grading layer 36-2. The thicknesses of the high-index layer 34 and the low-index layer 38 may typically be on the order of nanometers to microns depending on the desired output beam divergence, and the thicknesses of the grading layers 36-1 through 36-3 may typically be on the order of nanometers to microns also.

The configuration of the second multilayer zone 32-2 may be repeated for each successive multilayer zone out to and including the N-th multilayer zone 32-N (not shown). In an alternative exemplary embodiment, the thicknesses of some or all of the layers of material in the successive multilayer zones may be different from the thicknesses of the corresponding layers of material in the second multilayer zone 32-2. For example, the thickness of the high-index layer 34 in the first multi-layer zone 32-1 may be on the order of a hundred microns, while in the second multi-layer zone, it may be on the order of tens of nanometers. In an alternative exemplary embodiment, the material composition of some or all of the material layers in the successive multilayer zones may be different from the material composition of the corresponding material layers in the second multilayer zone 32-2.

The selection of materials for the multilayers meets at least a first criteria for a specific photon energy application. In accordance with the first criterion, and using the example of five material layers in a multilayer zone, the real refractive indices $n_i$ of the five material layers in each of the multilayer zones are specified such that the difference between the real parts of the refractive indices between two adjacent layers (i.e., $n_i - n_{i \pm 1}$) is as large as possible for the specified range of incident photon energy. Complying with this first criterion serves to avoid abrupt changes in electron density from one material layer to the adjacent material layer and thus increases the reflectivity at the material layer interfaces over that of a two-material system. That is, for the example shown, the values for $(n_1 - n_3)$, $(n_3 - n_4)$, $(n_4 - n_5)$, and $(n_5 - n_2)$ are maximized for a specified energy range by an appropriate selection of materials.

Meeting a second criterion will provide optimal reflectivity from a multilayer stack. In accordance with the second criterion, the differences in photon absorption between adjacent material layers are kept as small as possible. That is, the values for the quantities $(\beta_3 - \beta_1)$, $(\beta_4 - \beta_3)$, $(\beta_5 - \beta_4)$ and $(\beta_2 - \beta_5)$ are minimized for a specified energy range. Complying with the second criterion serves to avoid abrupt changes in mass density from one material layer to the adjacent material layer and, when combined with the first criterion, improves the reflectivity from the entire multilayer stack. Thus, for the particular example shown in the illustration, increased reflectivity would be obtained when both criteria are satisfied, making $n_1 > n_3 > n_4 > n_5 > n_2$ and $\beta_2 > \beta_5 > \beta_4 > \beta_3 > \beta_1$.

The material specified for the low-index layer 38 may be determined by the maximum photon energy that the corresponding multilayer zone 32-N needs to redirect and block. The value for this maximum photon energy may be determined by the application in which the multilayer material stack 30 is to be used. Maximizing the real refractive index difference between adjacent layers while minimizing the photon absorption differential results in much improved total internal reflection from an entire multilayer zone, such as multilayer zone 32-2. Understandably, this reflectivity may be less than 100%, due to, for example, (i) some of the incident photons passing through the low-index layer 38 into the next multilayer zone, if the low-index layer 38 is relatively thin, and (ii) mismatch in photon absorption properties between adjacent material layers.

This can be seen in the diagrammatical cross sectional view of FIG. 3 in which most of the incident photon beam 40 is shown reflected by the second multilayer zone 32-2 but a spurious beamlet 42-6 may pass into the next multilayer zone (not shown). Note also that the illustration is not drawn to scale, and that the material layer thicknesses and the angles of incidence and reflection for the incident photon beam 40 are exaggerated for clarity of illustration. A first part of the incident photon beam 40 undergoes total internal reflection at a first interface 50, formed between the high-index layer 34 and the first grading layer 36-1, and emerges from the multilayer material stack 30 as a first beamlet 42-1.

A second part of the incident photon beam 40 reflects at a second interface 52 and emerges from the multilayer material stack 30 as a second beamlet 42-2. In an exemplary embodiment, the second beamlet 42-2 has a different intensity from that of the first reflected beamlet 42-1, and is usually of lower intensity. For example, an even lower intensity, third part of the incident photon beam 40 may reflect at a third interface 54 and emerge from the multilayer material stack 30 as a possibly even lower intensity third beamlet 42-3. Similarly, a yet lower intensity, fourth part of the incident photon beam 40 may reflect at a fourth interface 56 and emerge as a still lower intensity fourth beamlet 42-4. And, in the illustration provided, a still lower intensity, fifth part of the incident photon beam 40 may reflect at a fifth interface 58 and emerge as a yet lower intensity beamlet 42-5, leaving a negligible portion of the incident beam 40 to pass into the next multilayer zone (not shown) as the spurious, very low intensity, beamlet 42-6.

The disclosed method of using the design criteria of maximizing the real refractive index difference, while minimizing the absorption difference between two successive layers, maximizes the critical angle available for achieving total internal reflection from each multilayer material stack, which maximizes the percentage of photons that satisfy the total internal reflection condition (angle of incidence<$\Theta_{critical}$) from the entire multilayer stack, and further, maximizes the number of photons that successfully undergo total internal reflection, i.e. that are not absorbed or transmitted during reflection. If the photon absorption differences between successive layers are not minimized in accordance with the above criterion, the percentage of photons that undergo total internal reflection may be significantly reduced.

Figure 4:
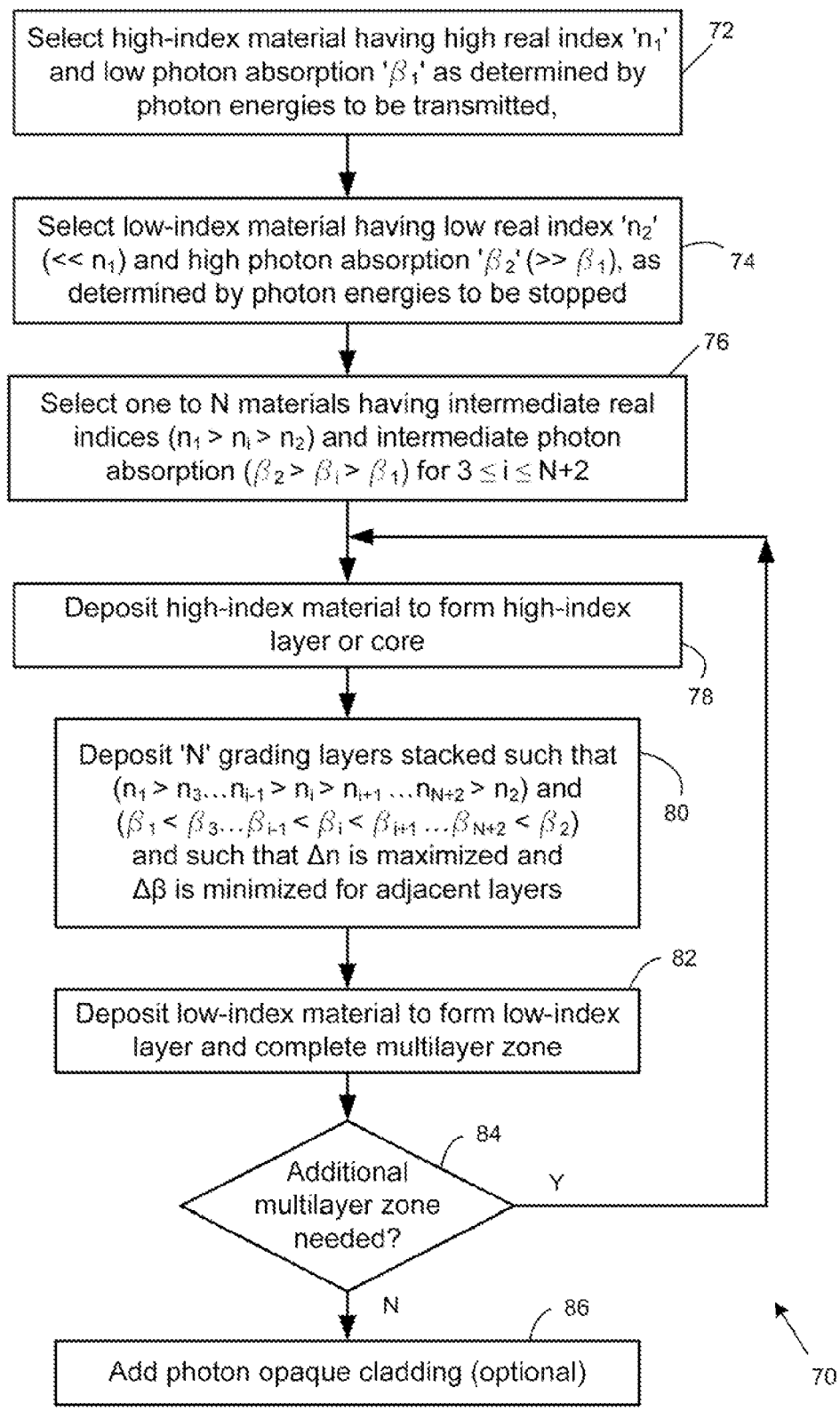
FIG. 4 is a flow diagram showing processing steps for fabrication of the multilayer zones of FIG. 3.
Figure 5:
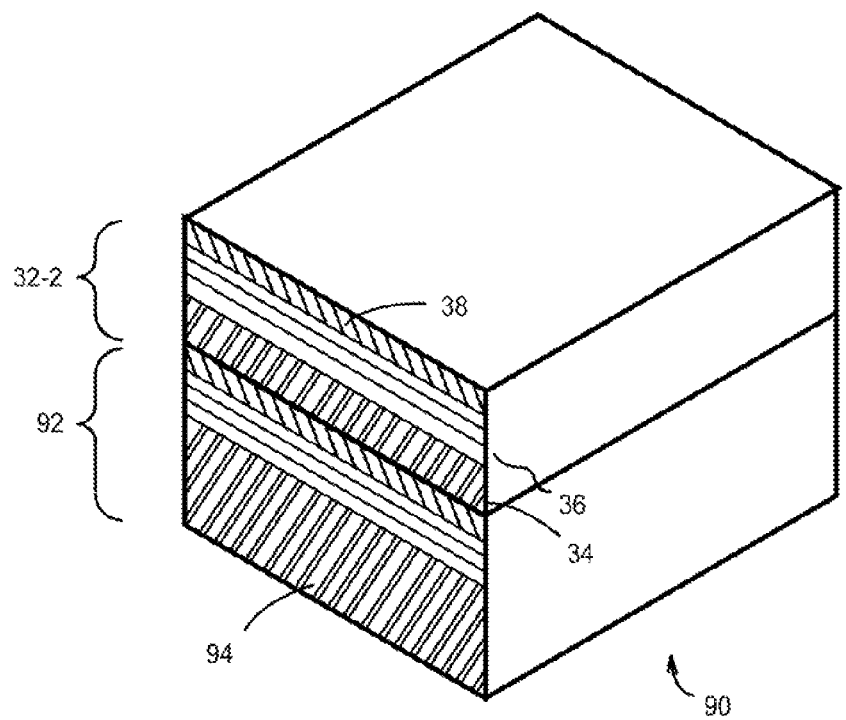
FIG. 5 is an isometric diagrammatic illustration of the multilayer zones of FIG. 3.

The fabrication process for an optic device using the design attributes of the exemplary embodiments disclosed herein can be described in greater detail with additional reference to a flow diagram 70 shown in FIG. 4, and to an optic device 90, shown in FIG. 5. For cylindrical optic devices (shown below), a high-index material such as beryllium or boron may be selected to form a high-index layer, at step 72, for applications having x-ray energies of, for example, about 10 keV. For planar optic device 90 and high energies, above about 200 keV, the high-index core material could be silicon, for example, to provide an initial smooth flat surface onto which subsequent multilayer zones can be formed.

The real part of the refractive index of the high-index material ($n_1$) preferably has a relatively high value, and the photon absorption coefficient ($\beta_1$) for the high-index material preferably has a relatively low value. A low-index material, such as iridium or depleted uranium, may be selected to form a low-index layer, at step 74. The real part of the low-index material's refractive index ($n_2$) preferably has a relatively low value (i.e., $n_2 \ll n_1$), and the photon absorption coefficient ($\beta_2$) for the low-index material preferably has a relatively high value (i.e., $\beta_2 \gg \beta_1$).

One to 'N' different grading materials or material compositions may be selected to form the grading layers, in step 76. The real part of the refractive index for each of the N grading materials may be selected so as to have a real refractive index value lying between ($n_2$) and ($n_1$). In the illustrated embodiment, each of the N grading materials advantageously has a photon absorption coefficient with a value lying between the values of the low photon absorption coefficient ($\beta_1$) and the high photon absorption coefficient ($\beta_2$) The high-index material may be deposited or plated, at step 78, or to form a high-index "core" or an "initial" layer. In an alternative exemplary embodiment, a substrate sheet may be formed or fabricated in advance and then provided as a starting point for the fabrication process described in the flow diagram 70, where the substrate sheet subsequently may be removed and may not become part of the resultant optic device.

At step 80, to produce a multilayer stack with optimal reflectivity, the three to N+2 grading materials, with real refractive indices $n_3$ to $n_{N+2}$, may be deposited on the high-index layer or core in a "stacking" sequence meeting the following criteria:

$$n_1 > n_3 > n_4 > \ldots > n_{N+1} > n_{N+2} 22\, n_2 \quad (1)$$

$$\beta_1 < \beta_3 < \beta_4 < \ldots \beta_{N+1} < \beta_{N+2} < \beta_2 \quad (2)$$

$(n_i - n_{i+1})$ is maximized for grading materials, where
$3 \leq i < N+1$ \quad (3)

$(n_1 - n_3)$ and $(n_{N+2} - n_2)$ are maximized for the transitions between the grading materials and the high-index and low-index materials \quad (4)

$(\beta_{i+1} - \beta_i)$ is minimized for grading materials, where
$3 \leq i < N+1$ \quad (5)

$(\beta_3 - \beta_1)$ and $(\beta_2 - \beta_{N+2})$ are minimized for the transitions between the grading materials and the high-index and low-index materials \quad (6)

The process executed in step 80 forms a series of grading layers, similar to the grading layers 36 shown in FIG. 3. The low-index material may then be deposited or plated on the outermost grading layer, at step 82, to complete fabrication of a multilayer zone, such as the first multilayer zone 32-1 shown in FIG. 3, or a multilayer zone 92 shown in FIG. 5. A determination may be made at decision step 84 as to whether additional multilayer zones are to be added. For example, in the optic device 90 (FIG. 5, above), the multilayer zone 32-2 was added to the initial multilayer zone 92. When one or more additional multilayer zones are thus to be added, the process returns to step 78 and another high-index material layer may be deposited or plated onto the current, outermost low-index material layer. With this configuration, the incident photon beam 40 may be reflected in the multilayer zones 32-1 and 32-2, as shown, with the angle of incidence projecting the incident photon beam 40 through the grading layer 36-1 into the grading layer 36-2, for example.

The process steps 78 through 82 may be repeated to produce the required number of multilayer zones. If the response to the decision step 84 is 'No,' an optional photon opaque layer may be added over the outermost low-index material layer, such as the photon absorption layer 44, shown in FIG. 2. Otherwise, the fabrication process may be terminated without providing the optional photon absorption layer.

The optic device 90 thus provides for the collection and redirection of UV-ray, x-ray, and gamma-ray radiation over a larger source solid angle Ω than has heretofore been possible in the relevant art. When applied to medical imaging systems, this may allow for decreased image exposure time, and patient dose, and simplify image analysis and potentially improve diagnostic accuracy for imaging modalities such as computed tomography (CT). Moreover, for x-ray applications, the x-ray source can be operated at, for example, two to ten times less power, extending the life of the x-ray source by an even greater amount.

Figure 6:
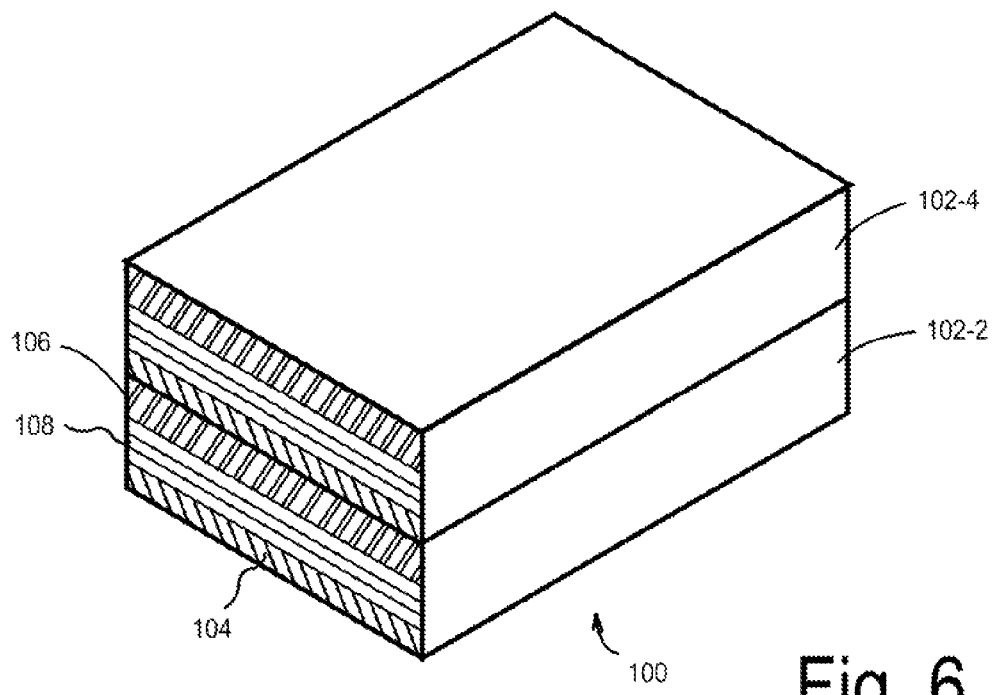
FIG. 6 is an alternative embodiment of the multilayer zones of FIG. 5 in which a low-index material layer is used for deposition of the grading zone.
Figure 7:
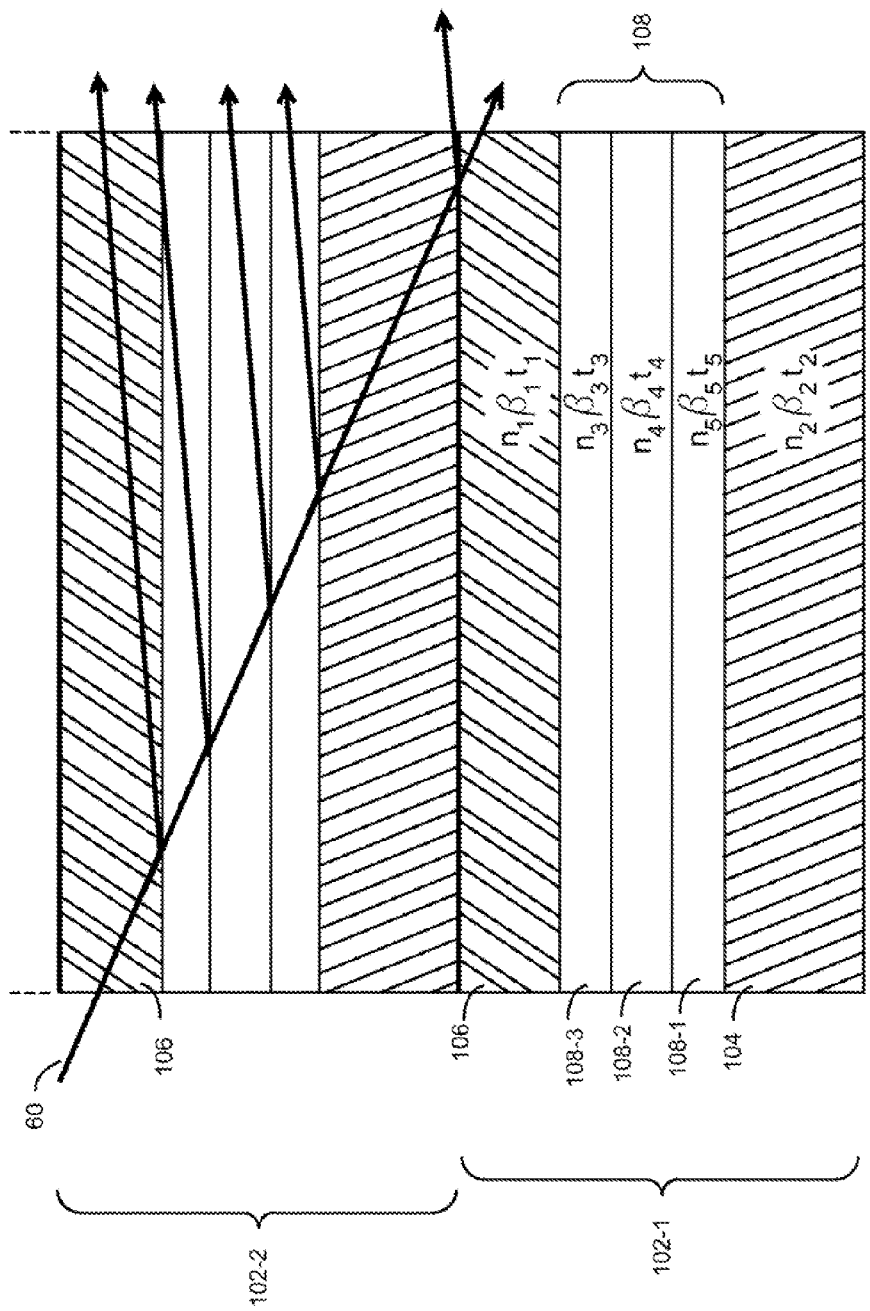
FIG. 7 is a detail cross-sectional view of the multilayer zones of FIG. 6.
Figure 8:
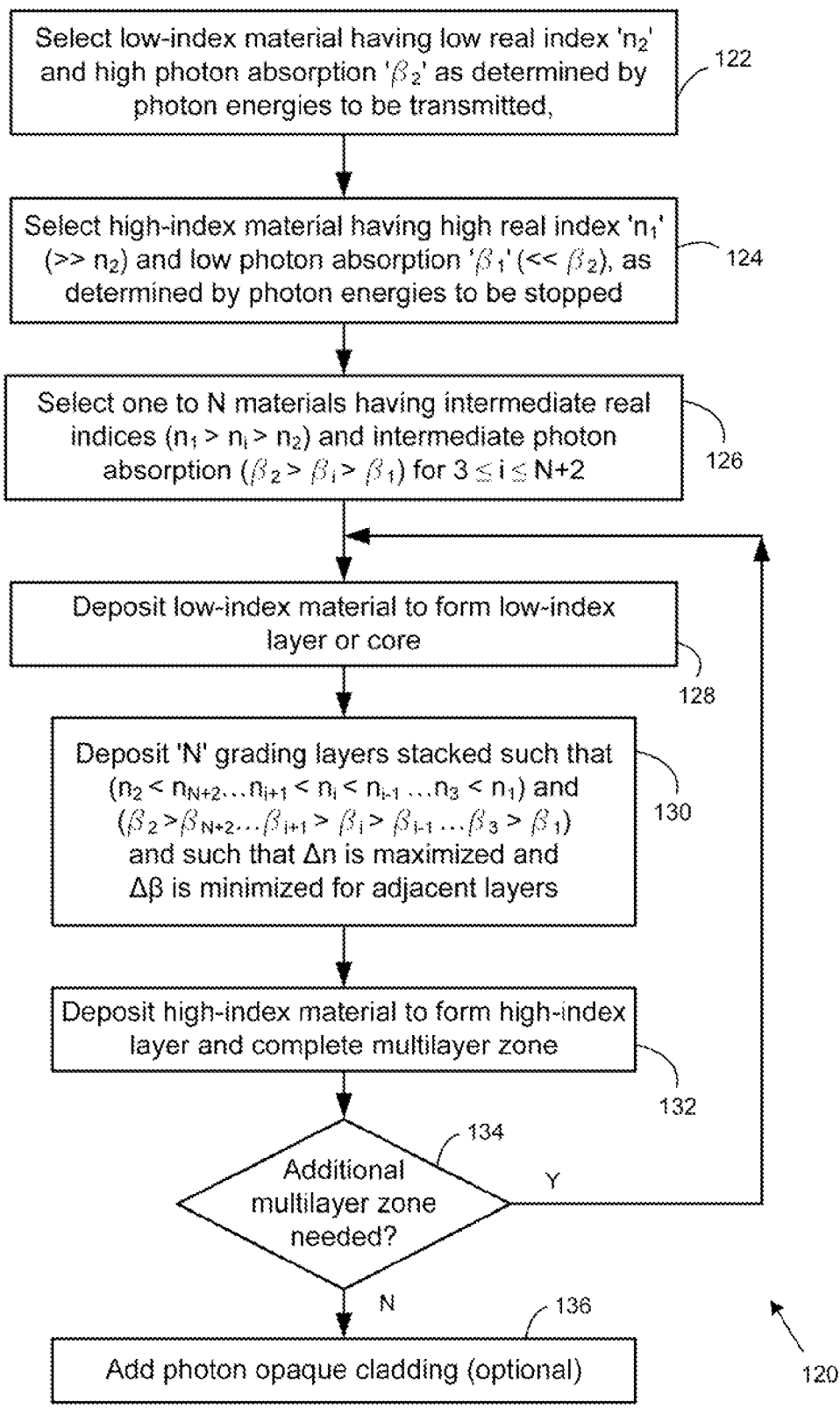
FIG. 8 is a flow diagram showing processing steps for fabrication of the multilayer zones of FIG. 7.

In an alternative exemplary embodiment, shown in FIG. 6, an optic device 100 comprises a first multilayer zone 102-2 and a similar second multilayer zone 102-4. Each of the multilayer zones 102-2 and 102-4 may be fabricated with an initial layer 104 comprising a low-index material, shown in FIG. 7, for example. The material for the low-index layer 104 in the optic device 100 may be selected as in step 122 of flow chart 120 in FIG. 8, using criteria similar for that of optic device 90 in FIG. 5. A high-index material may be selected for a high-index layer 106, at step 124, with the materials for the grading zone 108 selected in step 126.

The low-index material is deposited or formed, at step 128, to form the low-index layer or core 104. Grading layers 108-1, 108-2, and 108-3 may be formed with the material having the largest index ($n_3$) adjacent to the high-index layer 106, and the material having the lowest index ($n_5$) adjacent to the low-index layer 104, at step 130. That is, if the following criteria are met then the reflectivity from the entire multilayer stack will be optimal:

$$n_2 < n_{N+2} < n_{N+1} < \ldots < n_4 < n_3 < n_1 \quad (7)$$

$$\beta_2 > \beta_{N+2} > \beta_{N+1} > \ldots > \beta_4 > \beta_3 > \beta_1 \quad (8)$$

$(n_i - n_{i+1})$ is maximized for grading materials, where $3 < i < N+1$ \quad (9)

$(n_1 - n_3)$ and $(n_{N+2} - n_2)$ are maximized for the transitions between the grading materials and the high-index and low-index materials \quad (10)

$(\beta_{i+1} - \beta_i)$ is minimized for grading materials, where $3 < i < N+1$ \quad (11)

$(\beta_3 - \beta_1)$ and $(\beta_2 - \beta_{N+2})$ are minimized for the transitions between the grading materials and the high-index and low-index materials \quad (12)

After the high-index material is deposited to form the high-index layer 106, at step 132, a decision is made at decision block 134 as to whether more multilayer zones are to be formed. If so, the steps 128 through 132 are repeated as necessary, and a photon opaque cladding is added, at step 136, if desired. With this configuration, an incident photon beam 60 may be reflected in the multilayer zones 102-1 and 102-2, as shown, with the angle of incidence projecting the incident photon beam 60 through the grading layer 108-3 into the grading layer 108-2, for example.

Figure 9:
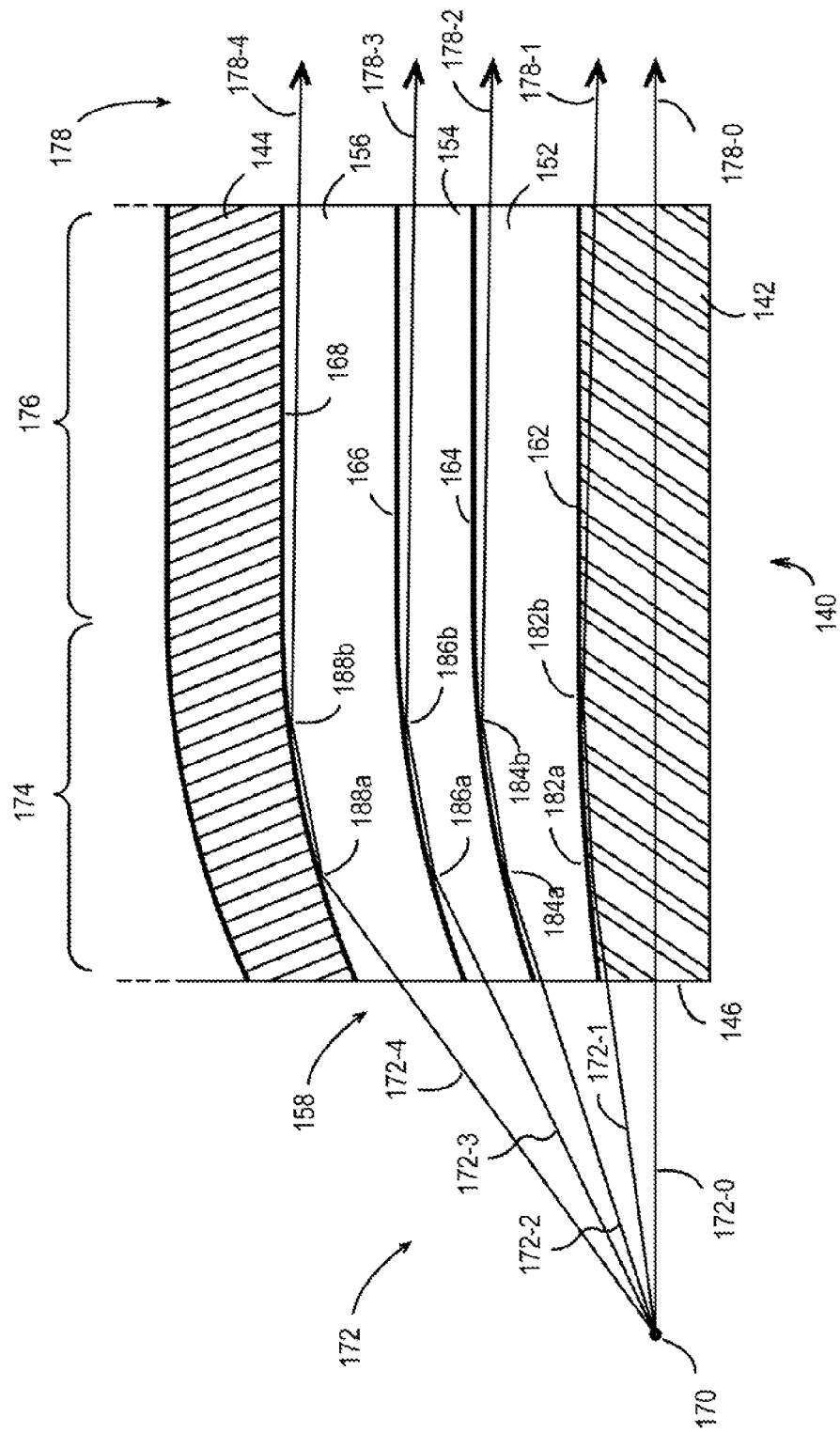
FIG. 9 is a detail cross-sectional view of an alternative exemplary embodiment of a single multilayer zone comprising a high-index material layer, a grading zone on the high-index material layer, and a low-index layer on the grading zone, the multilayer zone configured to include a redirection section and a transmission section.

FIG. 9 is a diagrammatical cross-sectional illustration of an exemplary embodiment of a single multilayer zone 140 comprising a high-index layer 142, a low-index layer 144, and a grading zone 158 having a plurality of grading layers 152, 154, and 156 disposed between the high-index layer 142 and the low-index layer 144. As noted above, thicknesses of the material layers are exaggerated for clarity of illustration. A first reflecting interface 162 is formed between the high-index layer 142 and the first grading layer 152. Similarly, a second reflecting interface 164 is formed between the first grading layer 152 and the second grading layer 154; a third reflecting interface 166 is formed between the second grading layer 154 and the third grading layer 156; and a fourth reflecting interface 168 formed between the third grading layer 156 and the low-index layer 144.

A divergent photon beam 172 may be provided by a photon source 170 to irradiate an input face 146 of the multilayer zone 140. Although the photon beam 172 is shown in the illustration as five diverging photon beamlets 172-0 through 172-4, it should be understood that the photon beam 172 is physically a continuous beam distributed over a specified solid angle of emission, and that the representation of the photon beam 172 as discrete beamlets is made only to facilitate the presentation of the various exemplary embodiments herein. In an exemplary embodiment, the multilayer zone 140 is configured to include a redirection section 174 and a transmission section 176, generally configured as shown. The redirection section 174 functions to substantially collimate and redirect the divergent photon beam 172 as a substantially collimated beam 178 to a desired region of space via the transmission section 176.

The first reflecting interface 162 is represented as having a curved portion continuous with a substantially straight portion in the cross-sectional view of FIG. 9. It should be understood that, physically, the first reflecting interface 162 forms a surface for reflection of the photon beamlet 172-1 and may comprise, for example, a planar, cylindrical, or conical surface, or a combination of these surfaces, as described in greater detail below. The cross sections of the reflecting interfaces 164, 166, and 168 are similarly shown as curved lines in the redirection section 174 and as straight lines in the transmission section 176. The curved-line portions of the reflecting interfaces 164, 166, and 168 represent physical surfaces of positive curvature such as, for example, cylindrical surfaces for collimation or redirection of the divergent photon beam 172, as explained in greater detail below. Similarly, straight-line portions of the reflecting interfaces 164, 166, and 168 represent physical planar or cylindrical surfaces, or combinations of planar and cylindrical surfaces.

Collimation of the photon beam 172 can best be understood by following the transmission paths of the photon beamlets 172-0 through 172-4. As shown, the center of the photon source 170 is generally coincident with an axis disposed through the middle of the high-index layer 142. A zeroth photon beamlet 172-0 may pass through the high-index layer 142 to emerge as a zeroth collimated photon beamlet 178-0 without reflection, as shown. In comparison, the first photon beamlet 172-1 may pass through the high-index layer 142 with one or more total internal reflections, as indicated by an initial reflection point 182a and a final reflection point 182b, and emerge as a first collimated photon beamlet 178-1. If the second photon beamlet 172-2 impinges on the initial reflection point 184a at less than the critical angle, with respect to the second reflecting interface 164, the second photon beamlet 172-2 may undergo multiple total internal reflections along the curved-line portion of the second reflecting interface 164, before passing out of the first grading layer 152 as a second collimated photon beamlet 178-2. These multiple total internal reflections are represented in the illustration by an initial reflection point 184a and a final reflection point 184b, where the intermediate multiple total internal reflections occurring between the initial reflection point 184*a* and the final reflection point 184*b* are not shown, for clarity of illustration.

In an exemplary embodiment, the curvature of the curved portion of the second reflecting interface 164 between the initial reflection point 184*a* and the final reflection point 184*b* is specified such that all subsequent reflections of the second photon beamlet 172-2 from the reflecting interface 164, between the initial reflection point 184*a* and the final reflection point 184*b*, occur at less than the critical angle and are thus total internal reflections.

Similarly, the third photon beamlet 172-3 may undergo multiple total internal reflections between an initial reflection point 186*a* and a final reflection point 186*b*, and the fourth photon beamlet 172-4 may undergo multiple total internal reflections between an initial reflection point 188*a* and a final reflection point 188*b*. The curvatures of the curved portions of the third and fourth reflecting interfaces 166 and 168 are specified such that multiple total internal reflections may occur along the portions of the reflecting interfaces 166 and 168 lying in the redirection section 174. In an exemplary embodiment, a photon beamlet may undergo hundreds or thousands of reflections along a corresponding curved surface in the redirection section 174 before passing out of the multilayer zone 140. It can be appreciated by one skilled in the art that the desired trajectories of the collimated photon beamlets 178-1 through 176-4 are achieved when the reflected beamlets pass from the redirection section 174 into the transmission section 176, that is, when the tangent to the curved portion of a layer is substantially parallel to the continuing linear portion. The physical length of the transmission section 176 may be largely arbitrary and can be specified so as to provide a convenient physical size for handling or integrating the single multilayer zone 140.

Figure 10:
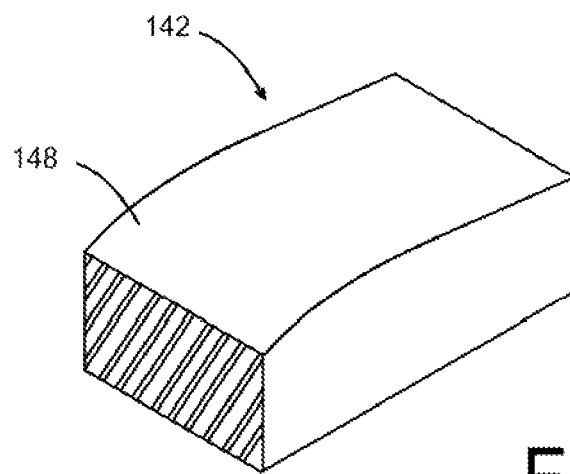
FIG. 10 is an isometric diagrammatic illustration of a planar core layer with a curved surface at one end.
Figure 11:
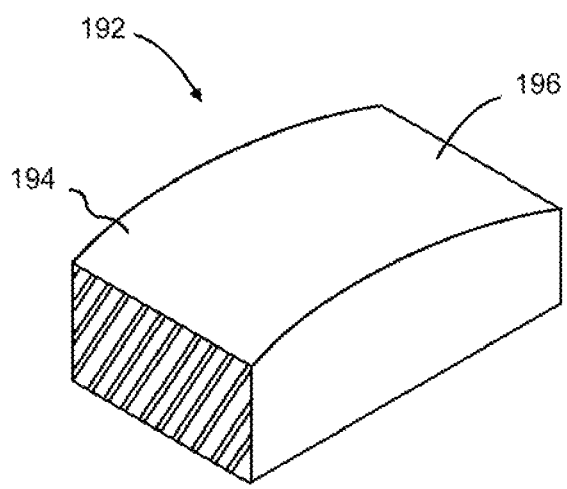
FIG. 11 is an isometric diagrammatic illustration of a planar core layer with curved surfaces at both ends.
Figure 12:
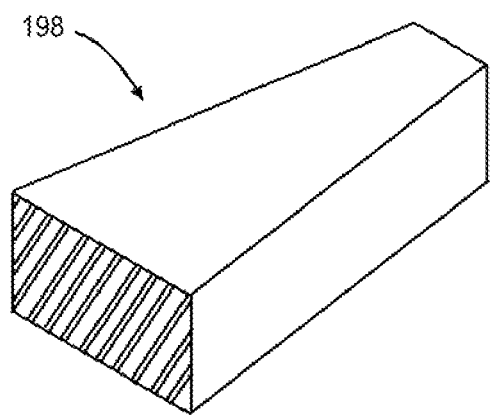
FIG. 12 is an isometric diagrammatic illustration of a wedge-shaped planar core layer.

The high-index layer 142 may be formed as a generally planar core or substrate with a curved or cylindrical surface 148 at one end, as shown in FIG. 10, for producing the curved interfaces in the redirection section 174 of the multilayer zone 140, shown in FIG. 9. Other core configurations are also possible, such as a core layer 192 having a first curved surface 194 at one end of the core layer 192 and a second curved surface 196 at the other end, as shown in FIG. 11. A tapered core 198, shown in FIG. 12, may be used in certain optic device stackups. Other core layer configurations, including configurations having both a taper and one or two curved surfaces (not shown), can also be used with the methods provided in the flow diagrams 70 and 120 to produce optic devices for collecting incident radiation of relatively high energies and over relatively large source solid angles, as described above.

Figure 13:
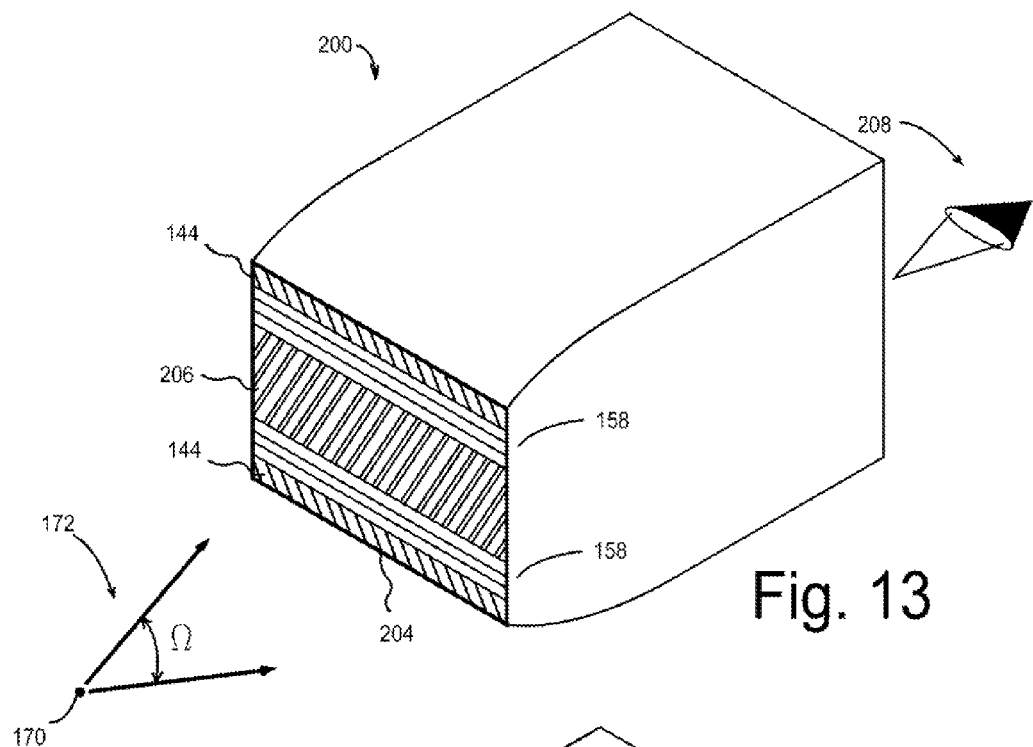
FIG. 13 is an isometric diagrammatical detail view of a planar optic device comprising multiple material layers used to form the output of a diverging ultraviolet-ray, x-ray, or gamma-ray source into a collimated ultraviolet-ray, x-ray, or gamma-ray fan beam.

FIG. 13 is a simplified isometric diagrammatical representation of an optic device 200, here shown with the output of the divergent photon source 170 irradiating an input face 204. The optic device 200 may be used to form a fan-shaped collimated photon beam output 208, the collimated photon beam 208 substantially transmitted in a series of planes lying parallel to the longitudinal symmetry plane of the optic device 200. With reference to FIG. 9, the optic device 200 of FIG. 13 may be fabricated by depositing grading zones 158 on both surfaces of a high-index layer 206, and then depositing low-index layers 144 on the grading zones 158. It can be appreciated that the optic device 200 is essentially a unitary combination of the multilayer zone 140 with its mirror image.

Figure 14:
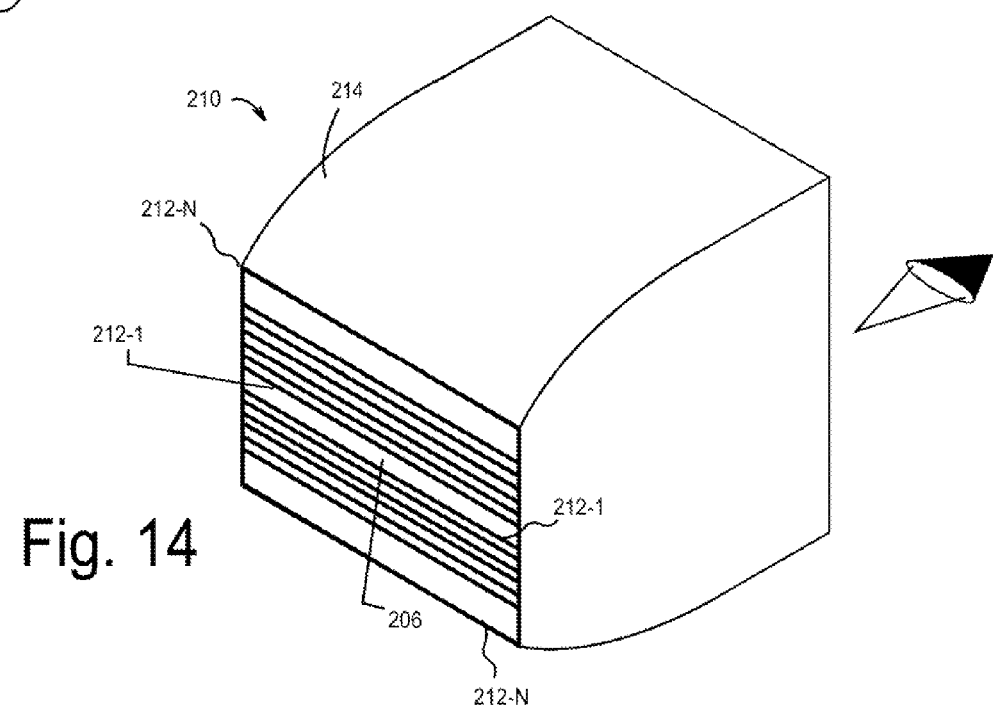
FIG. 14 is an isometric-diagrammatical detail view of the planar optic device of FIG. 13 comprising additional multilayer zones.

By repeating the deposition of multilayers both above and below the high-index layer 206 of the optic device 200, a larger optic device 210 may be formed, as shown in FIG. 14. The optic device 210 thus includes the central high-index layer 206 over which a plurality of multilayer zones 212-1 through 212-N have been repeatedly deposited to yield a planar stackup of hundreds or thousands or millions of multilayer zones, substantially as shown. Part of the multilayer zones 212-1 through 212-N comprise cylindrical surfaces to form a redirection section 214 that can function to collimate an incident divergent photon beam.

Figure 15:
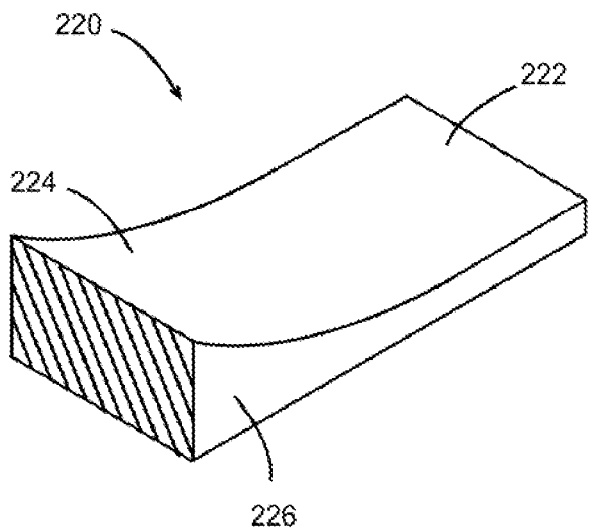
FIG. 15 is an isometric diagrammatic illustration of a planar core layer with a convex curved surface at one end.
Figure 16:
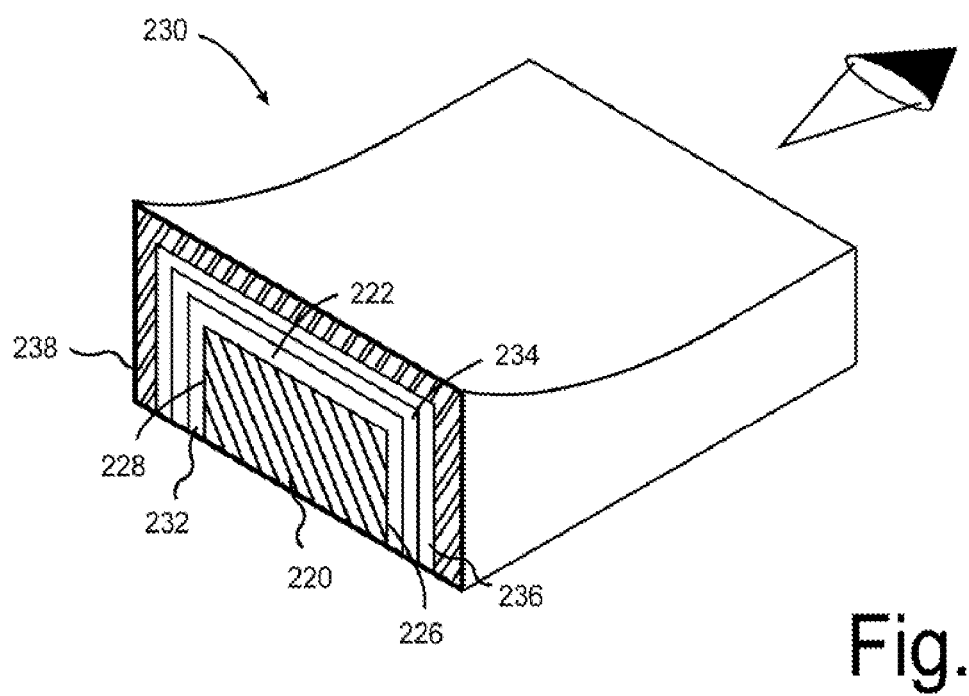
FIG. 16 is an isometric diagrammatical detail view of an exemplary embodiment of a planar optic device fabricated from the planar core of FIG. 15.

In another exemplary embodiment, shown in FIG. 15, a core layer 220 may comprise a substantially planar layer with a greater thickness at a first end of a core surface 222 than at a second end. In the configuration shown, the core layer 220 includes a concave cylindrical section 224 to provide for fabrication of an optic device 230, shown in FIG. 16, as well as for fabrication of other optic devices suitable for receiving convergent radiation beams, described below. In the optic device 230, grading layers 232, 234, and 236 and an outer low-index layer 238 are formed on the core surface 222 and on both edges 226 and 228 of the core layer 220. Additional multilayer zones (not shown) may be added to the optic device 230 in accordance with the flow diagram 70.

Figure 17:
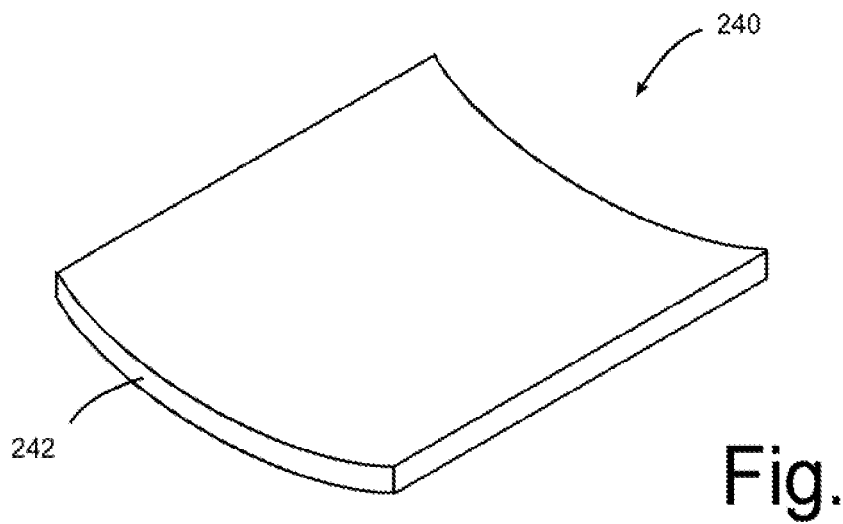
FIG. 17 is an isometric diagrammatic illustration of a planar core layer with an arc-shaped input face.
Figure 18:
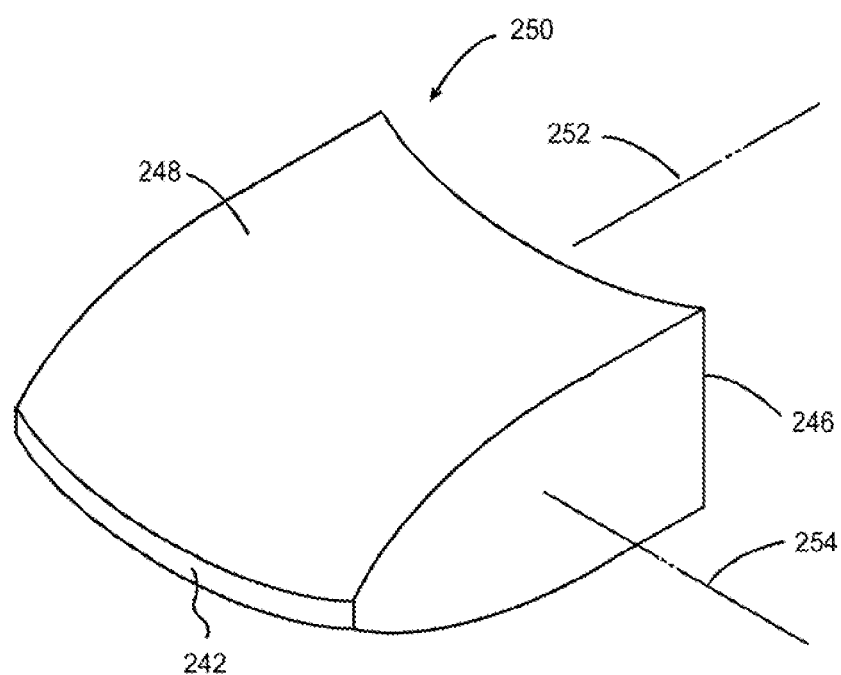
FIG. 18 is an alternative embodiment of the core layer of FIG. 17 where the core layer has an arc-shaped output face of greater thickness than the arc-shaped input face.

There is shown in FIG. 17 an alternative exemplary embodiment of a core layer 240 having an arcuate input face 242. The core layer 240 may have a substantially uniform thickness to provide a cylindrically-shaped surface to accommodate subsequent deposition of grading layers. In another exemplary embodiment, shown in FIG. 18, a core layer 250 may have an arcuate output face 246 of greater thickness than the arcuate input face 242. Accordingly, the core layer 250 provides a saddle-shaped surface 248 for subsequent deposition of grading layers, where the saddle-shaped surface 248 includes a positive curvature along a longitudinal axis 252 and a negative curvature along a transverse axis 254.

Figure 19:
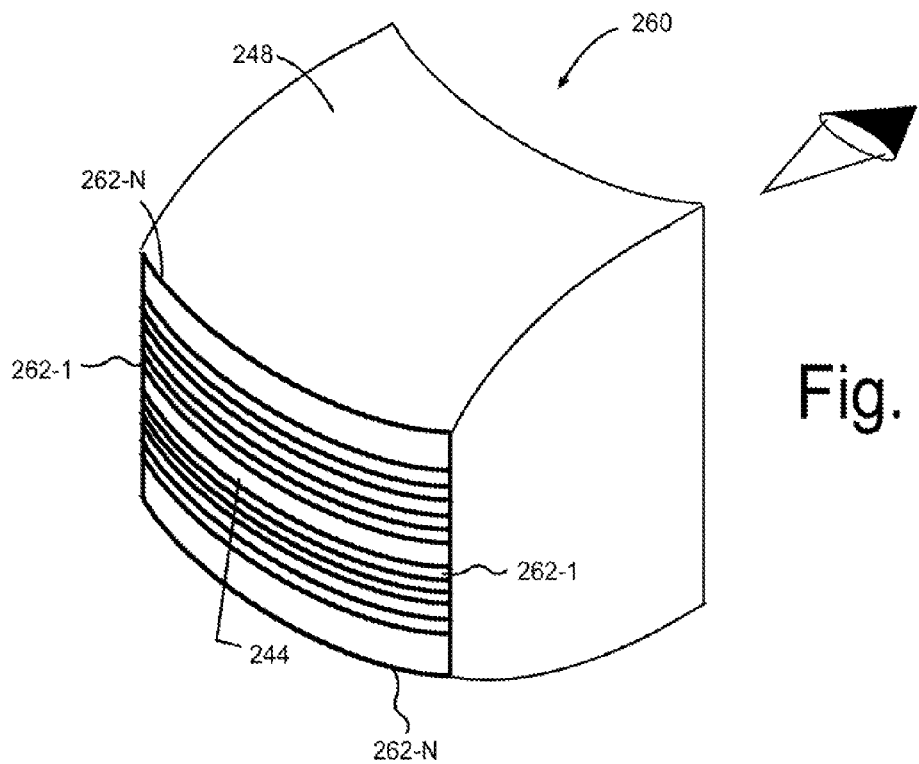
FIG. 19 is an isometric diagrammatical detail view of an alternative exemplary embodiment of a planar optic device fabricated on the core layer of FIG. 18.
Figure 20:
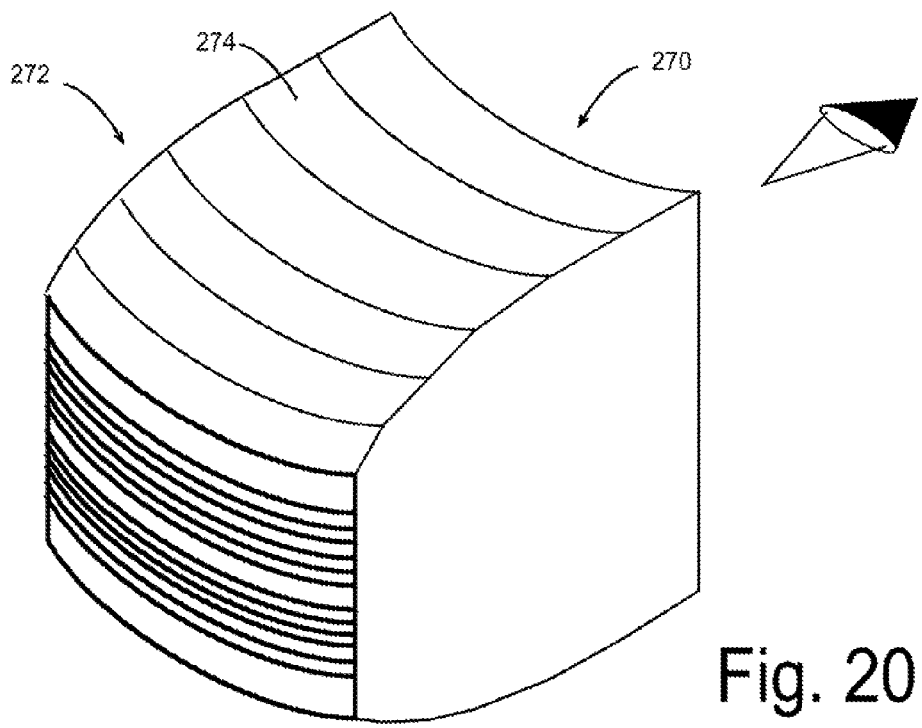
FIG. 20 is an alternative exemplary embodiment of the planar optic device of FIG. 19 having plurality of adjacent segments forming a saddle surface.

There is shown in FIG. 19 an optic device 260 including the core layer 244. A plurality of planar multilayer zones 262-1 through 262-N have been serially deposited, both above and below the core layer 244, to yield a planar stackup of hundreds, thousands, or millions of multilayer zones, similar to the optic device 210 shown in FIG. 14. The multilayer zones 262-1 through 262-N may comprise saddle surfaces, such as the saddle surface 248. In an alternative exemplary embodiment, shown in FIG. 20, an optic device 270 may have an upper segmented surface 272 comprising a plurality of adjacent segments 274, each segment 274 shaped so as to collectively approximate a saddle surface, similar to the saddle surface 248. It can be appreciated by one skilled in the art that the segmented surface 272 may be more easily fabricated than the saddle surface 248.

Figure 21:
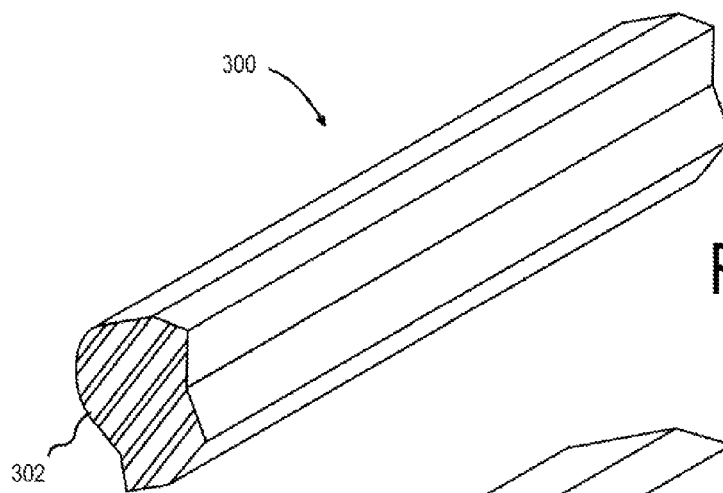
FIG. 21 is an isometric diagrammatic illustration of a core with a generic cross-sectional shape.
Figure 22:
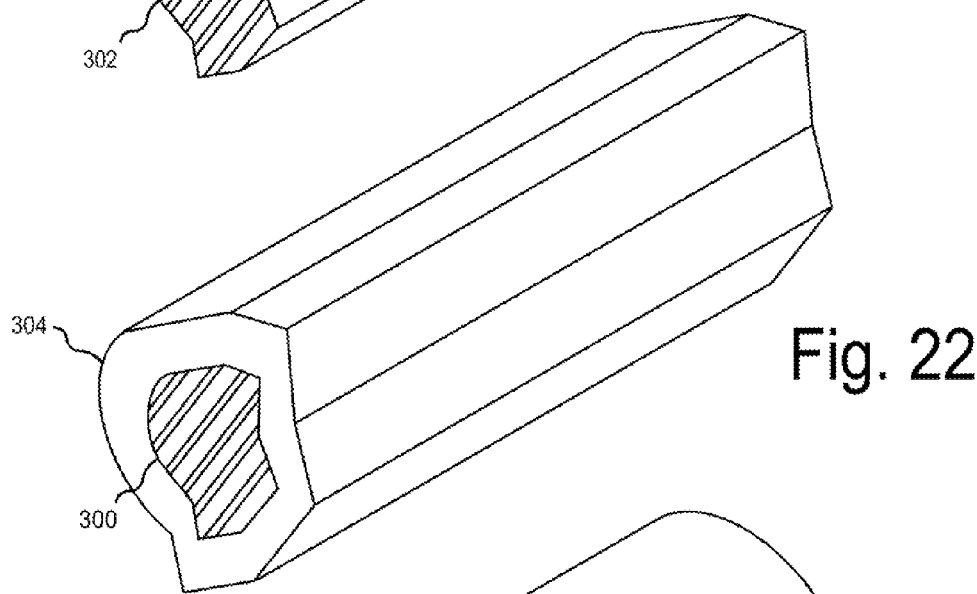
FIG. 22 is an isometric diagrammatic illustration of the core of FIG. 21 with a deposited conformal layer of substantially uniform thickness.
Figure 23:
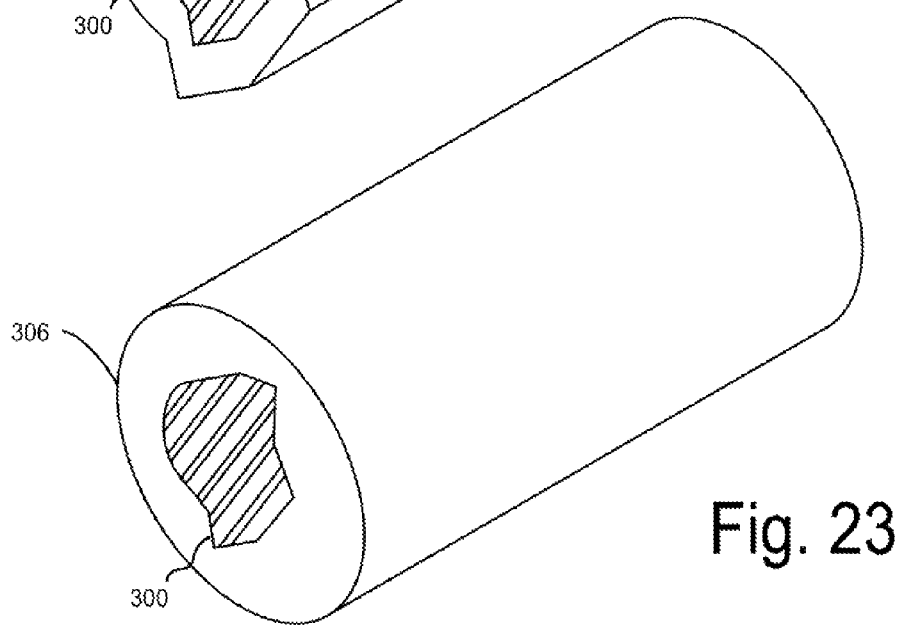
FIG. 23 is an isometric diagrammatic illustration of the core of FIG. 21 with a deposited layer of thickness varied to produce a circular cross section.

In alternative exemplary embodiments to the above-described optic device configurations, any of the core layer 34 (FIG. 3, above), the core layer 104 (FIG. 7, above), and the core layer 142 (FIG. 9, above) may comprise rod-like shapes, rather than planar shapes. A rod-like core 300, shown in FIG. 21, may comprise a curvilinear or polygonal cross sectional shape, represented in the figure by a generic cross-sectional shape 302 comprising a plurality of piece-wise continuous curved and straight segments. The rod-like core may be configured with any cross section forming a two-dimensional closed area, where the perimeter of the closed area may be continuous or piecewise continuous, and may comprise lines or curves. The closed area may be projected in a third dimension to define the rod-like core itself. Fabrication of grading layers onto the rod-like core 300 may be accomplished by deposition of approximately uniform layers, such as a first uniform grading layer 304 deposited on the rod-like core 300, as shown in FIG. 22. Alternatively, overlying grading layers may be deposited as one or more non-uniform layers to "smooth out" the outer surface and produce an optic device having an approximately circular cross section, such as exemplified by a first non-uniform grading layer 306 deposited on the rod-like core 300, as shown in FIG. 23.

Figure 24:
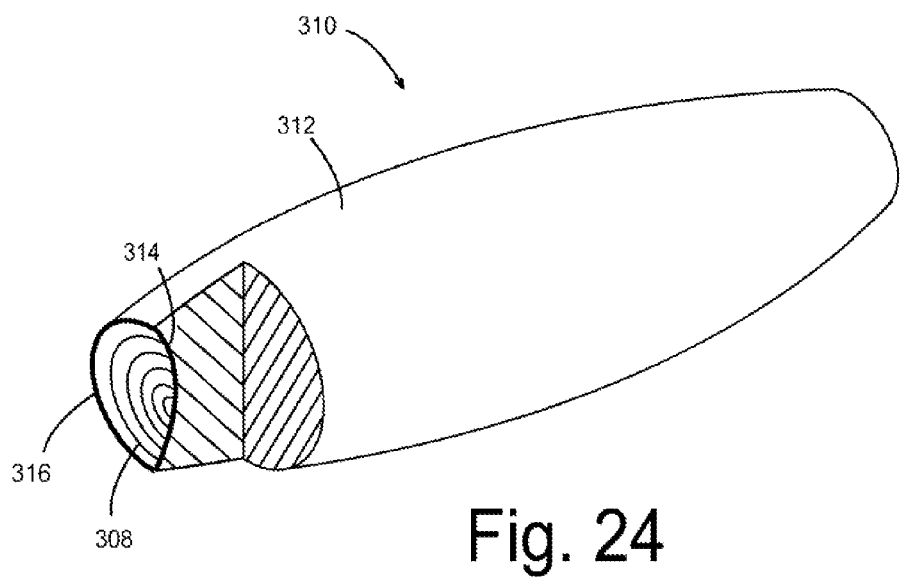
FIG. 24 is an isometric diagrammatic illustration, with partial cutaway, of an optical device having a concave surface at an input face.

The optic devices described herein may comprise input and/or output surfaces having flat, skewed, convex, and/or concave surface portions. An optic device 310, shown in FIG. 24, has a substantially circular cross-sectional shape that varies along a longitudinal axis, for example, where the size of the cross section is largest near the longitudinal center. The optic device 310 may be thus configured to receive a divergent radiation input beam, as explained in greater detail below. In an exemplary embodiment, the optic device 310 includes a concave input surface 316, as shown, where a portion of the optic device has been cut away to more clearly show a curvature 314 to the concave input surface 316. The curvature 314 may be cylindrical, spherical, elliptical, parabolic, or hyperbolic, for example. Although not shown, the output surface may also be curved, in which case the curvature influences the divergence of the beam output by the optic.

The optic device 310 may be fabricated on a rod-like core (not shown) of similar geometry to the optic device 310 for greater ease in achieving the desired final shape. That is, the rod-like core may be configured to have a substantially circular cross-sectional shape variable along a longitudinal axis, where the size of the cross-sectional shape is largest near the longitudinal center of the rod-like core.

Figure 25:
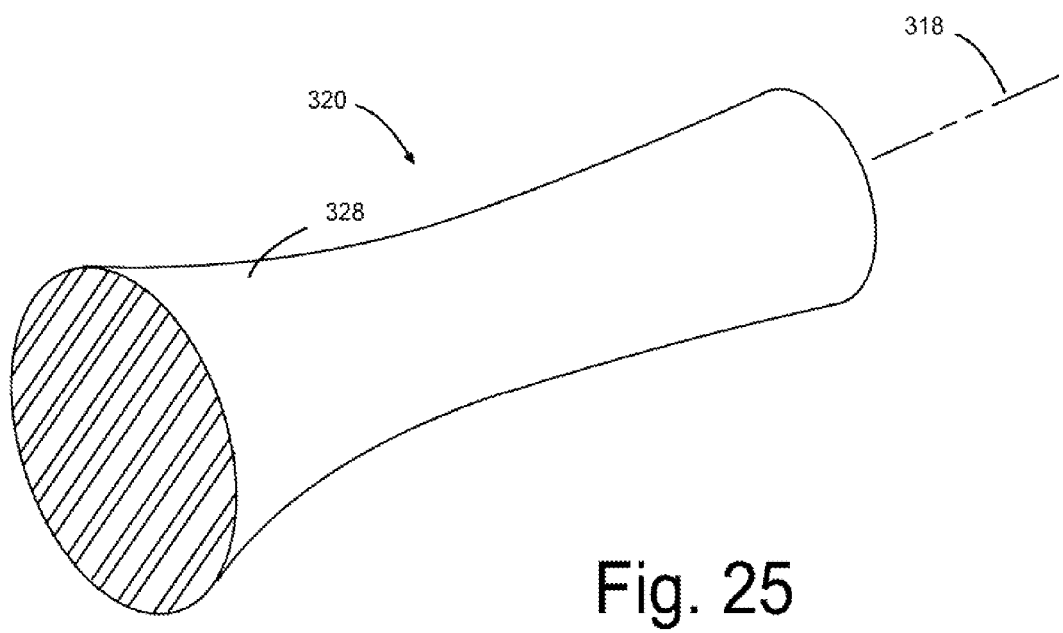
FIG. 25 is an isometric diagrammatic illustration of a core having a saddle surface near an input face.

In an alternative exemplary embodiment, a rod-like core 320, shown in FIG. 25, also has a substantially circular cross-sectional shape that varies along a longitudinal axis 318, but in which the size of the cross section is smallest near the longitudinal center. Accordingly, the rod-like core 320 may form a saddle surface 328 near an input face. It can be appreciated by one skilled in the art that an optic device (not shown) fabricated using deposition of multizone layers on the rod-like core 320 may itself have a similar circular cross-sectional shape in which the size of the cross section is smallest near the longitudinal center of the optic device.

Figure 26:
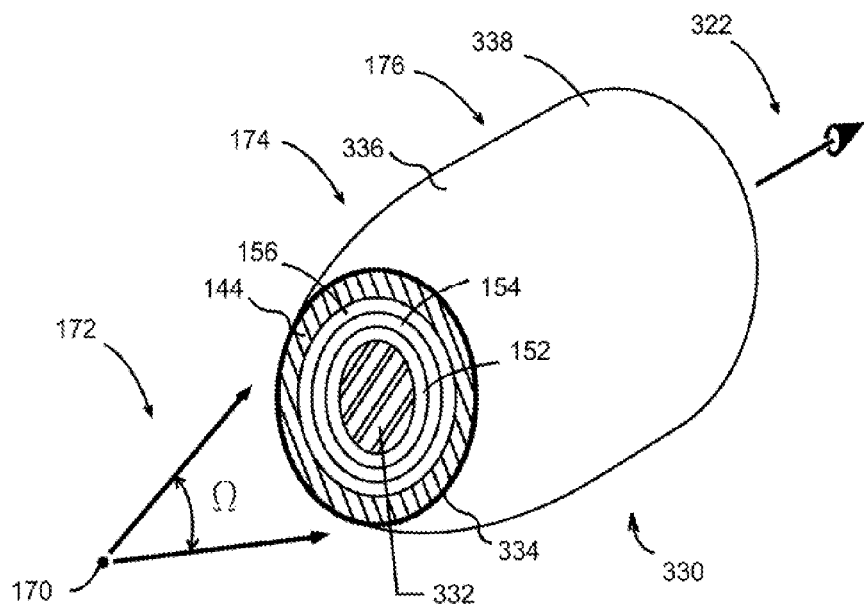
FIG. 26 is an isometric-diagrammatical detail view of an optic device with circular cross section comprising multiple material layers used to form the output of a diverging ultraviolet ray, x-ray, or gamma ray source into a collimated ultraviolet ray, x-ray, or gamma ray beam, respectively.

FIG. 26 is a simplified isometric diagrammatical representation of an optic device 330 used to form the output of the divergent photon source 170 into a substantially collimated photon beam 322. The divergent photon beam 172 emitted by the photon source 170 is shown having a solid angle Ω of emission and irradiating an input face 334 of the optic device 330. Referring also to FIG. 9, the optic device 330 may be viewed as a rotation of the single multilayer zone 140 about the high-index layer 142. In this configuration, the high-index layer may comprise a high-index cylindrical core 332 having a circular or elliptical cross section. The grading layers 152, 154, and 156 form a grading zone that physically encloses the high-index cylindrical core 332. Note that the layer thicknesses have been exaggerated for clarity of illustration.

The redirection section 174 in the optic device 330 functions to substantially collimate and redirect the divergent photon beam 170 along a longitudinal axis of the optic device 330 to a desired target via the transmission section 176. A portion of the outer low-index layer 144 forming the redirection section 174 comprises a convex surface 336 curved toward the optic device 330 longitudinal axis. In comparison, the transmission section 176 has a cylindrical surface 338 with an axis substantially parallel to the longitudinal axis of the optic device 330.

The optic device 330 may be fabricated by beginning with a shaped, cylindrical fiber of a high-index material, such as beryllium or boron, for the high-index layer core 332. The first grading layer 152 and all subsequent layers in the optic, such as the concentric or coplanar grading layers 154 and 156, and the outer-low index layer 144, may be deposited on the high-index layer core 332 by one or more combinations of vapor phase deposition, jet spray deposition, such as thermal or ultrasonic, chemical plating process, or similar process known in the relevant art. It should be understood that the deposition or plating process can be continued as needed to produce an optic device 340, shown in FIG. 27, comprising a substantial plurality of multilayer zones 342-1 through 342-N so as to accommodate radiation collection from a larger solid angle Ω of emission and to produce a larger output beam 324.

Figure 28:
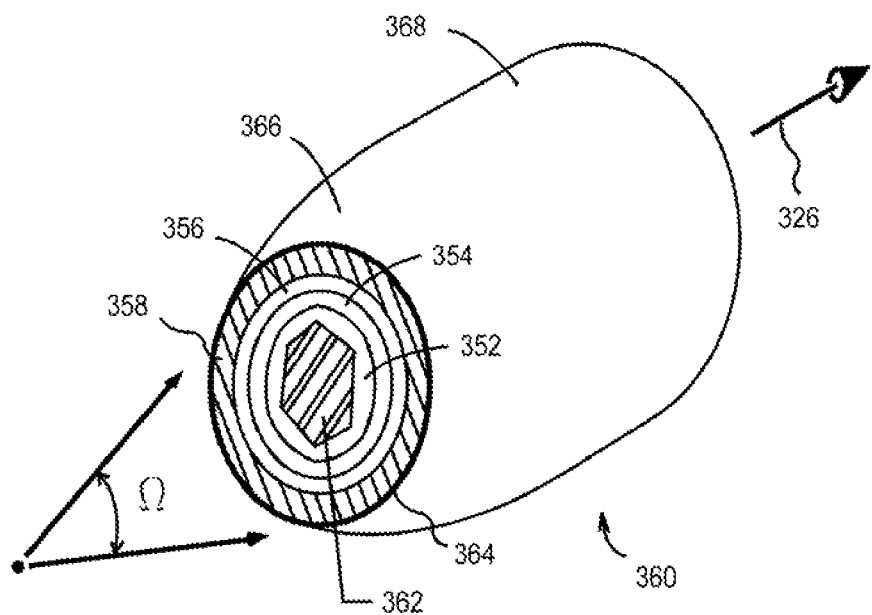
FIG. 28 is an alternative exemplary embodiment of the optic device of FIG. 26, where the high-index core layer comprises a hexagonal cross sectional shape.

FIG. 28 is a simplified isometric diagrammatical representation of an optic device 360, which is an alternative exemplary embodiment of the optic device 330, in FIG. 26. In the configuration shown, a high-index core 362 comprises a rod-like configuration with a hexagonal cross section. Substantially cylindrical grading layers 352, 354, and 356 physically enclose the high-index core 362, and an outer low-index layer 358 encloses the grading layers 352-356. The cross sectional shape of the high-index core 362 may be determined by the particular geometry of a high-index fiber, comprising beryllium or boron, for example, specified for fabrication of the optic device 360, and may include other cross-sectional shapes, such as curvilinear or polygonal cross-sectional shapes, without affecting functionality of the optic device 360. A portion of the outer low-index layer 358 near an input face 364 comprises a convex surface 366 with respect to the longitudinal axis of the optic device 360. A portion of the optic device 360 near an output beam 326 comprises a right cylindrical surface 368.

Figure 29:
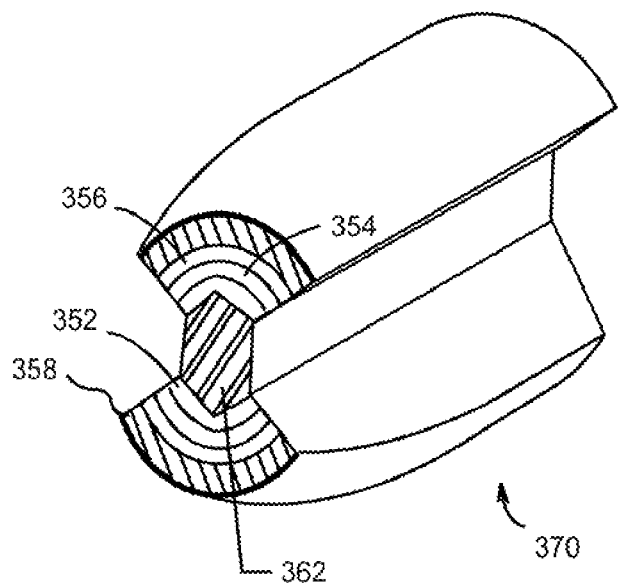
FIG. 29 is an alternative exemplary embodiment of the optic device of FIG. 28, where a grading layer only partially covers the high-index core layer.

In an alternative exemplary embodiment to the optic device 360, shown in FIG. 29, a modified optic device 370 includes deposition over only a portion of the high-index core 362. The outer low-index layer 358 and the grading layers 352-356 are have been deposited on two upper faces and on two lower faces of the hexagonal cross section high-index core 362. The output beam of the optic device 360 comprises more of a fan-shaped beam than the output beam 326 of the optic device 360, above.

Figure 27:
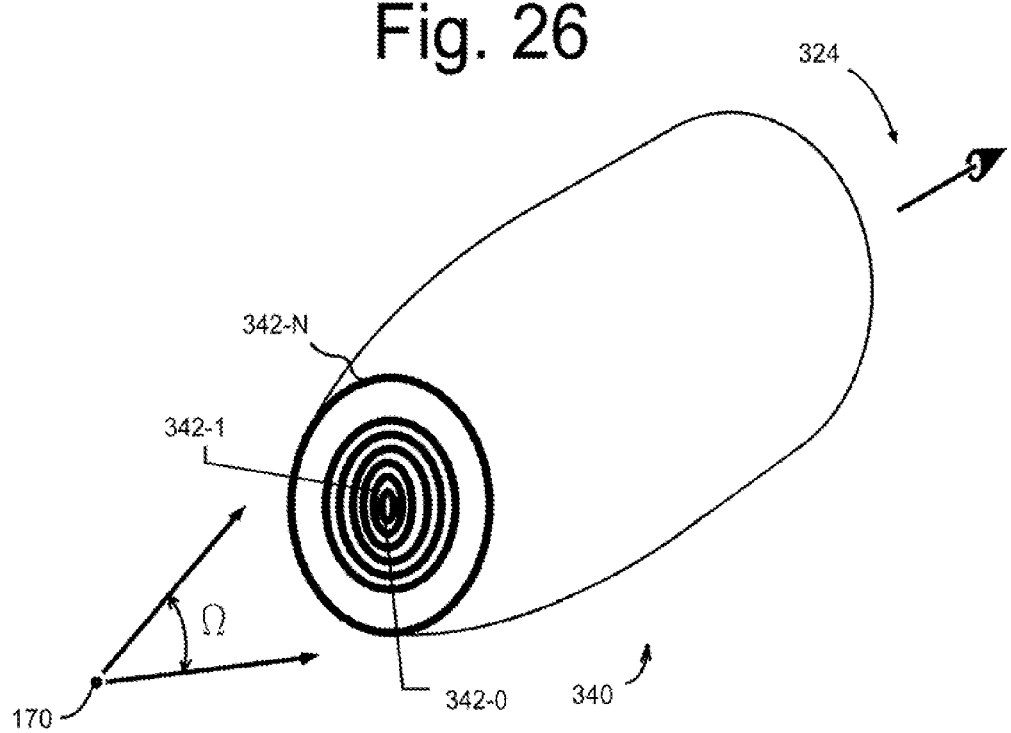
FIG. 27 is an alternative embodiment of the optic device of FIG. 26 comprising a plurality of additional multilayer zones.
Figure 30:
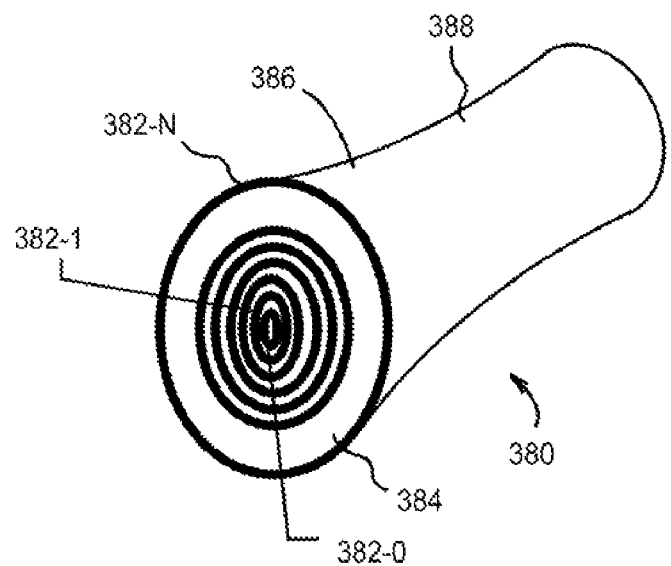
FIG. 30 is an alternative exemplary embodiment of the optic device of FIG. 27 adapted to input an incident convergent ultraviolet ray, x-ray, or gamma ray beam.
Figure 31:
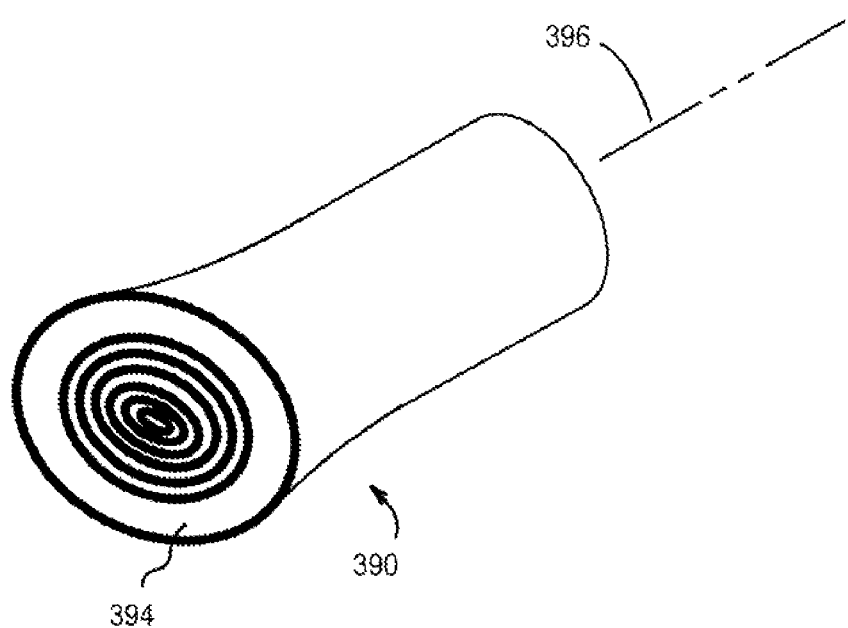
FIG. 31 is an alternative exemplary embodiment of the optic device of FIG. 30 comprising a skewed input face.

An optic device 380, shown in FIG. 30, includes a central multilayer zone core 382-0 having a buildup similar to that shown for the optic device 340 of FIG. 27. Concentric multilayer zones 382-1 through 382-N, best seen at an input face 384, may be subsequently deposited to yield hundreds or thousands or millions of concentric multilayer zones. It can be appreciated by one skilled in the art that part of the optic device near the input face 384 comprises a "saddle" surface 386 whereby the input face 384 has a larger diameter than a transmission section 388 of the optic device 380. This particular configuration may allow for conversion of a convergent input beam (not shown) into a substantially collimated output beam, as described in greater detail below. In an alternative exemplary embodiment, shown in FIG. 31, an optic device 390 may comprise a skewed input face 394, that is, an input face oriented at a less than 90° angle to a longitudinal axis 396. An input face can be planar or curved 308 (FIG. 24, above) in concave, convex (not shown), or complex curved (not shown) shapes or any combination of these shapes.

Figure 32:
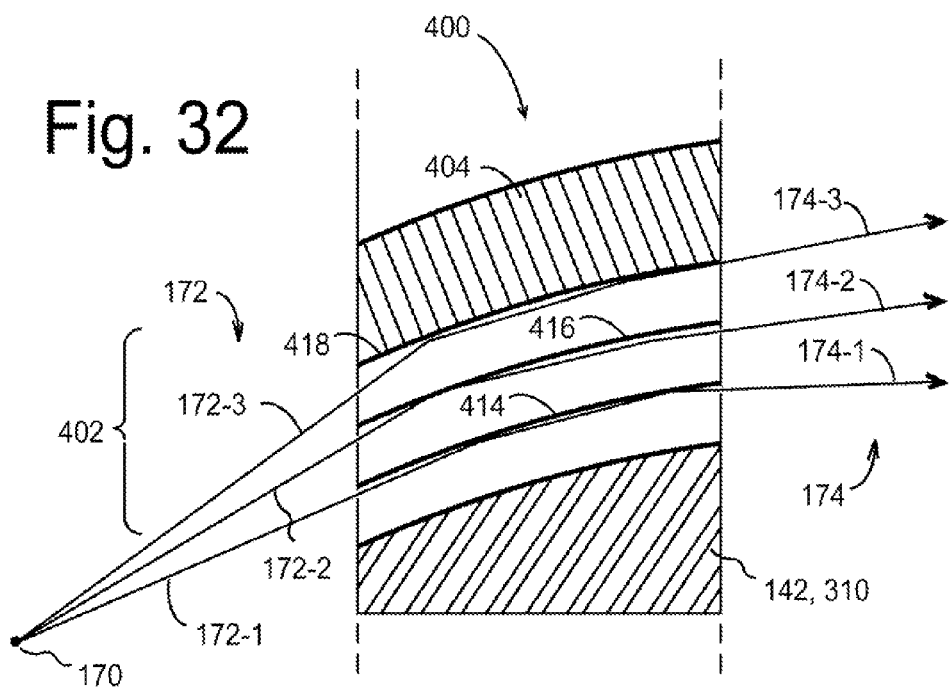
FIG. 32 is a detail cross-sectional view of an alternative exemplary embodiment of a single multilayer zone configured to produce a substantially divergent ultraviolet-ray, x-ray, or gamma-ray beam output from a divergent ultraviolet-ray, x-ray, or gamma-ray beam input.

In an alternative aspect of the invention, shown in FIG. 32, an optic device 400 is configured to redirect the divergent input photon beam 172 emitted by the photon source 170 into a second divergent photon beam 174. The optic device 400 includes a multilayer zone comprising a high-index layer, such as the high-index core 142 or the high-index core 310, described above. The optic device 400 also comprises a plurality of grading layers 402 disposed on the high-index core 142 or 310, and a low-index layer 404 disposed on the grading layers 402. The optic device 400 comprises curved-line interfaces between the multiple layers. For a configuration in which the optic device 400 comprises a rod-like device, similar to the optic devices 330 (FIG. 26 above) or the optic device 340 (FIG. 27, above), or comprises a planar device, similar to the optic device 200 (FIG. 13, above) or the optic device 210 (FIG. 14, above), the low-index layer 404 forms a convex surface curved toward the longitudinal axis of the optic device 400.

It can be seen that for the curved reflection interfaces 414, 416, and 418, as shown in FIG. 32, tangents to the curved interfaces at the output face of the corresponding optic device will not be parallel to the optical axis of the optic device, unlike for the comparable curved portions of the reflection interfaces 164, 166, and 168 in the similarly-configured multilayer zone 140, shown in FIG. 9. Accordingly, input photon beamlets 172-1, 172-2, and 172-3, in FIG. 32, are not sufficiently redirected inside the optic device 400 to form a collimated beam, and the output photon beam 174 in FIG. 32 remains divergent, although to a lesser degree than the input photon beam 172. In comparison, the divergent photon beam 172, in FIG. 9, is substantially collimated by traveling through a redirection section 174 in which tangents to the curved reflection surfaces at the output face of the optic device become parallel to an optic axis of the optic device and the straight line reflection surfaces in the transmission section 176.

Figure 33:
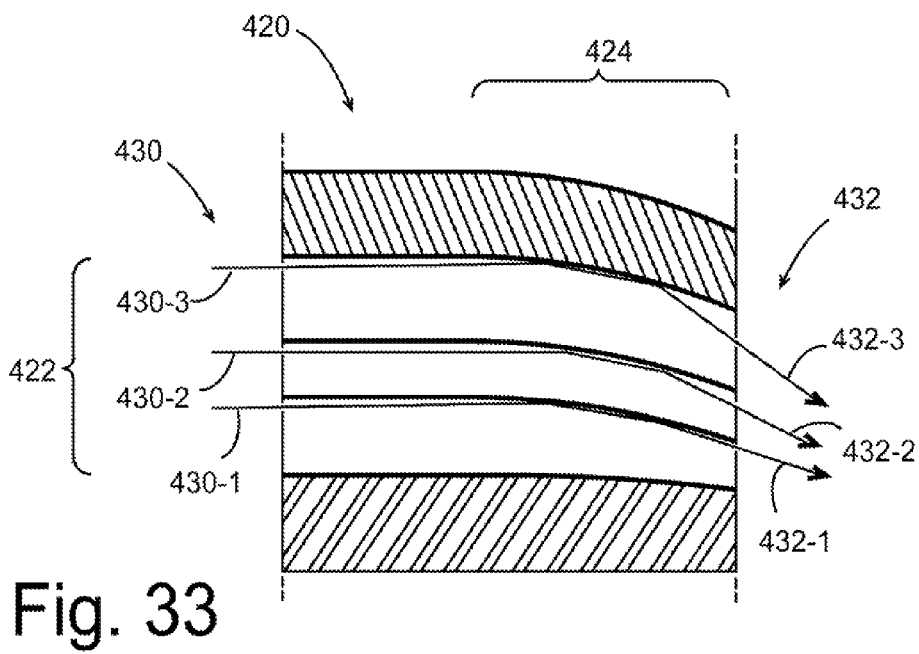
FIG. 33 is a detail cross-sectional view of an alternative exemplary embodiment of a single multilayer zone configured to produce a substantially convergent ultraviolet-ray, x-ray, or gamma-ray beam output from a parallel or collimated ultraviolet-ray, x-ray, or gamma-ray beam input.

FIG. 33 shows an exemplary embodiment of an optic device 420 that is configured to redirect a substantially collimated input photon beam 430 into a substantially convergent output photon beam 432. For clarity of illustration, only photon beamlets 430-1, 430-2, and 430-3 are shown passing through a plurality of grading zone layers 422 in the optic device 420 to emerge as corresponding output photon beamlets 432-1, 432-2, and 432-3, respectively. It can be seen that the trajectories of the incoming photon beamlets 430-1, 430-2, and 430-3 are redirected into convergence by undergoing multiple total internal reflections in a redirection section 424 of the optic device 420. It can be appreciated by one skilled in the art that the optic device 420 may be configured similar to the multilayer zone 140 shown in FIG. 9, but with the difference that the photon beamlets are input at the transmission section 176 and are output from the redirection section 174.

Figure 34:
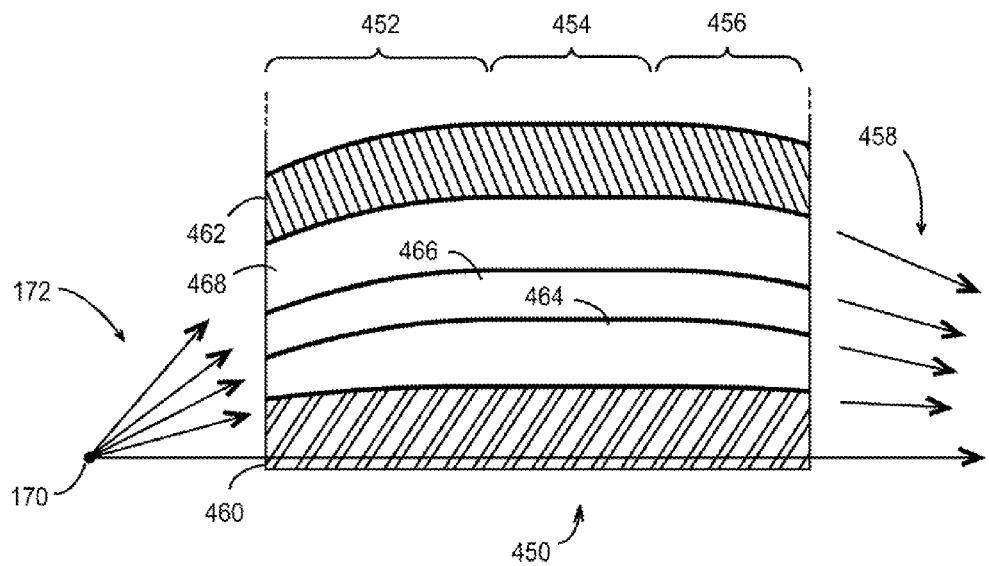
FIG. 34 is a detail cross-sectional view of an alternative exemplary embodiment of a single multilayer zone configured to produce a substantially convergent ultraviolet-ray, x-ray, or gamma-ray beam output from a divergent ultraviolet-ray, x-ray, or gamma-ray beam input.

In another aspect of the invention, shown in FIG. 34, an optic device 450 is configured to redirect the divergent photon beam 172 into a substantially convergent output photon beam 458. The optic device 450 includes a first redirection section 452 and a second redirection section 456, and may or may not include an enclosed transmission section 454. A low-index layer 462 and grading layers 464, 466, and 468 in the redirection sections 452 and 456 have reflection surfaces curved toward a high-index layer 460 of the optic device 450. It can be appreciated that a rod-shaped optic device 450 may include the core 310, and that a planar-shaped optic device 450 may include the core layer 192.

Figure 35:
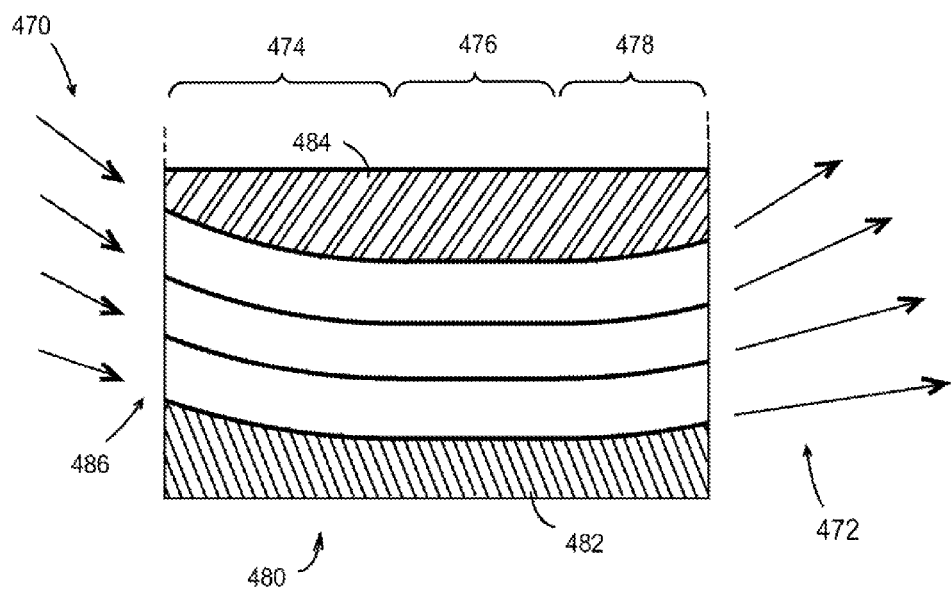
FIG. 35 is a detail cross-sectional view of an alternative exemplary embodiment of a single multilayer zone configured to produce a substantially divergent ultraviolet-ray, x-ray, or gamma-ray beam output from a convergent ultraviolet-ray, x-ray, or gamma-ray beam input.

In another aspect of the invention, shown in FIG. 35, an optic device 480 is configured to redirect a convergent photon beam 470 into a divergent output photon beam 472. The optic device 480 includes a first redirection section 474, an optional intermediate transmission section 476, and a second redirection section 478. A low-index core 482 in the optic device 480 comprises a shape similar to the core layer 220 (FIG. 16 above) or the rod-like core 320 (FIG. 25 above) with an additional saddle-shaped redirection region on the output side of the optic. In the configuration shown, a grading zone 486 may be disposed on the low-index core 482, and the top or outside of the optic device 480 comprises a high-index layer 484.

The low-index core 482 and the grading zone 486 in the redirection sections 474 and 476 have reflection surfaces curved upward, or outward, toward the high-index layer 484. That is, for a configuration in which the optic device 480 comprises a rod-like device, the underside of the high-index layer 484 forms a concave surface curved away from a longitudinal axis of the optic device 480. For a configuration in which the optic device 480 comprises a planar device, the high-index layer 484 may form a cylindrical surface curved away from the longitudinal axis.

Figure 36:
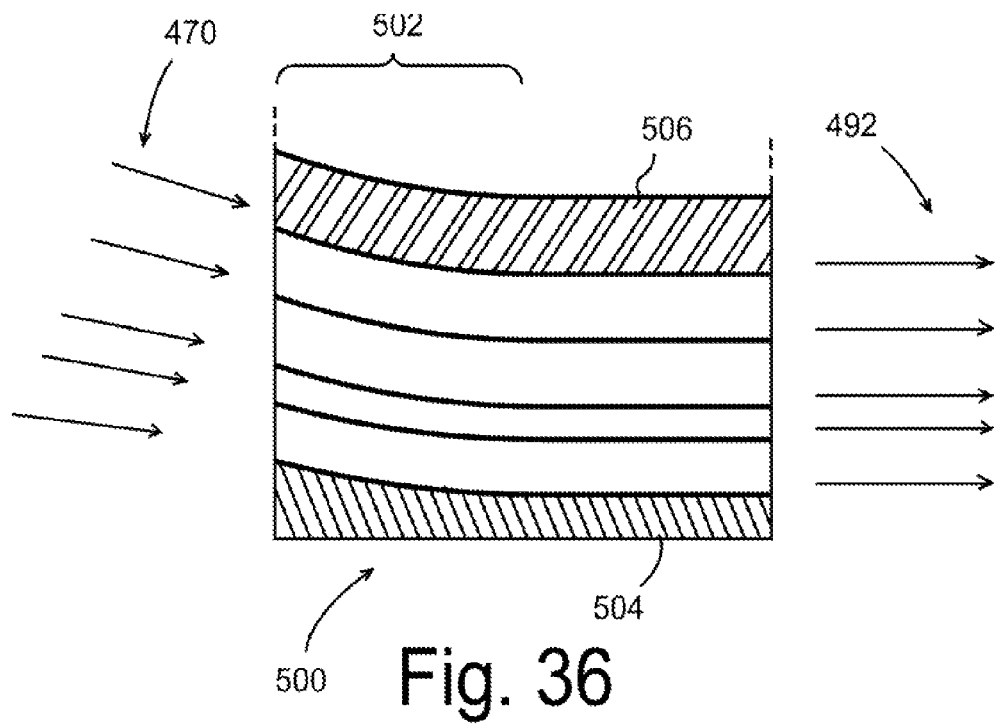
FIG. 36 is a detail cross-sectional view of an alternative exemplary embodiment of a single multilayer zone configured to produce a substantially parallel or collimated ultraviolet-ray, x-ray, or gamma-ray beam output from a convergent ultraviolet-ray, x-ray, or gamma-ray beam input.

In still another aspect of the invention, shown in FIG. 36, an optic device 500 is configured to redirect the convergent photon beam 470 into a collimated output photon beam 492. The optic device 500 includes a redirection section 502, where the core 504 of the optic device 500 comprises a low-index material that may be shaped like the core layer 220 or the rod-like core 320, and the top or outside layer 506 comprises a high-index material.

Figure 37:
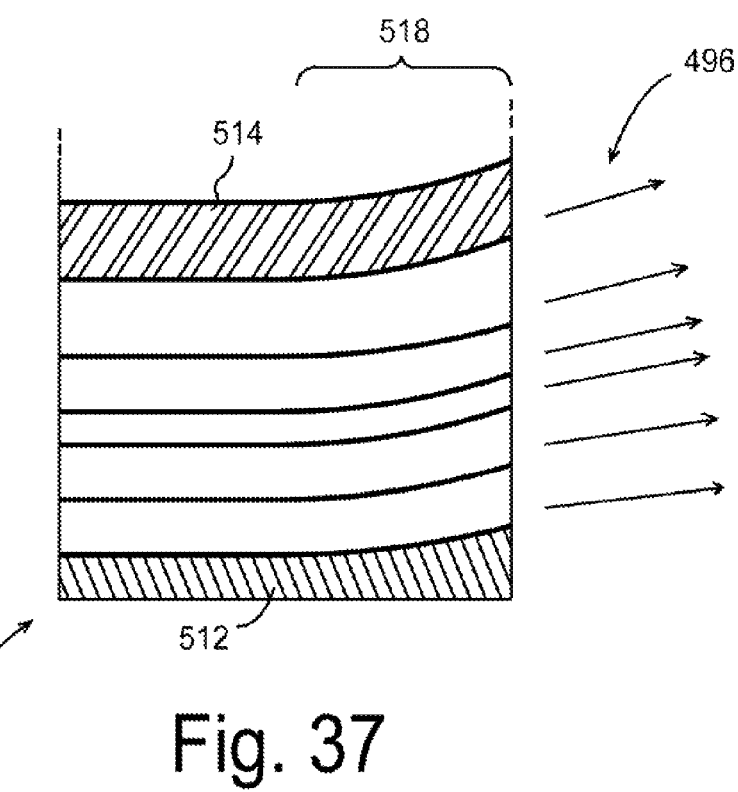
FIG. 37 is a detail cross-sectional view of an alternative exemplary embodiment of a single multilayer zone configured to produce a substantially divergent ultraviolet-ray, x-ray, or gamma-ray beam output from a parallel or collimated ultraviolet-ray, x-ray, or gamma-ray beam input.

In yet another aspect of the invention, shown in FIG. 37, an optic device 510 is configured to redirect an essentially collimated photon beam 494 into a divergent output photon beam 496. The optic device 510 includes a redirection section 518, with a core 512 comprising a low-index layer, and the top or outside layer comprising a high-index layer 514. The low-index layer 512 and the intermediate grading layers in the redirection section 518 have reflection surfaces curved upward toward the high-index layer 514 of the optic device 510.

Figure 38:
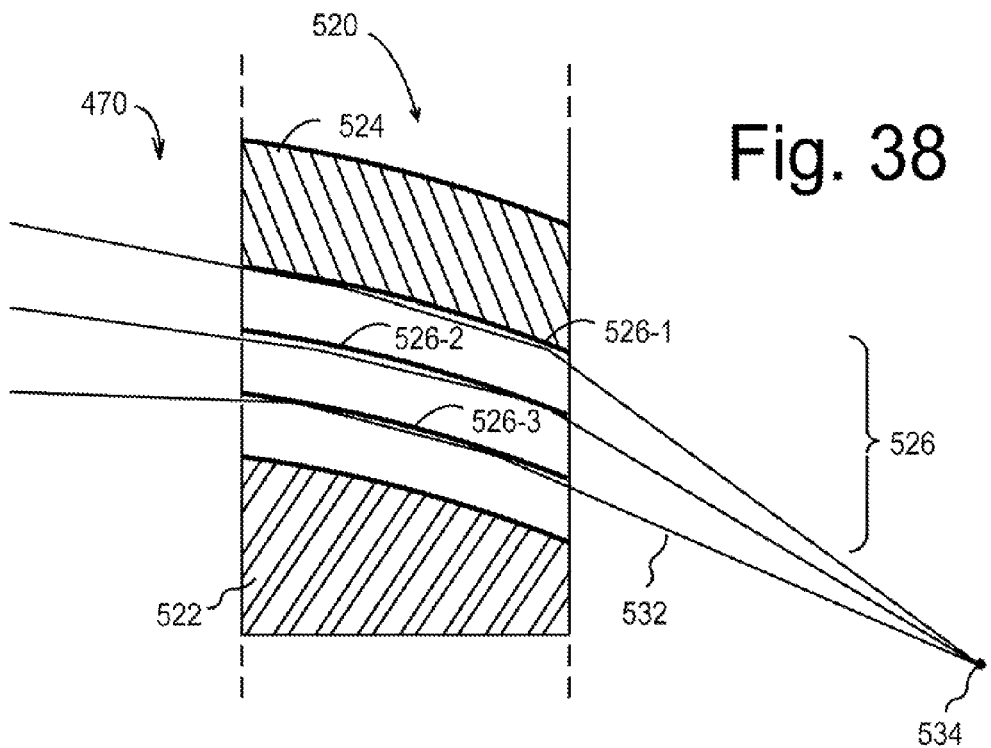
FIG. 38 is a detail cross-sectional view of an alternative exemplary embodiment of a single multilayer zone configured to produce a substantially convergent ultraviolet-ray, x-ray, or gamma-ray beam output from a convergent ultraviolet-ray, x-ray, or gamma-ray beam input.

In still another aspect of the invention, shown in FIG. 38, an optic device 520 is configured to redirect the convergent photon beam 470 into another convergent photon beam 532 having a focal point 534. The optic device 520 includes a high-index layer 522 and a top or outside low-index layer 524. The low-index layer 524 and intermediate grading layers 526 form reflection surfaces, represented by surfaces 526-1, 526-2, and 526-3, curved downward toward the high-index layer 522. The optic device 520 can be used, for example, to control the position of the focal point 534, and can also be used to control the size of the focal point 534.

Figure 39:
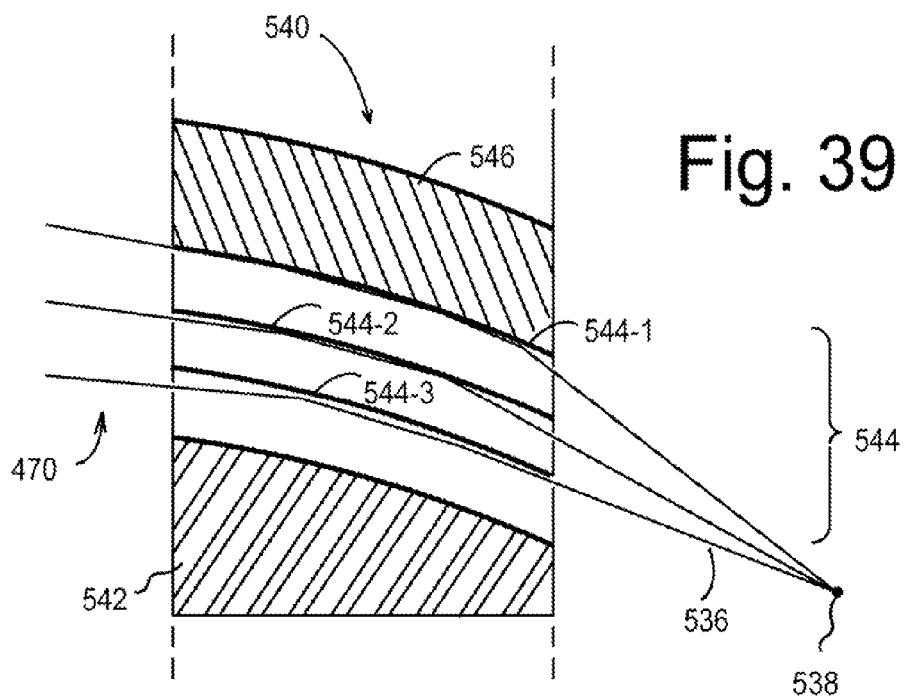
FIG. 39 is an alternative exemplary embodiment of the single multilayer zone of FIG. 38 having a shorter focal range than the single multilayer zone of FIG. 38.

In an alternative aspect of the optic device 520, an optic device 540, shown in FIG. 39, is configured to redirect the convergent photon beam 470 into an even more convergent output photon beam 536 having a focal point 538 at a shorter distance from the optic device 540 than the focal point 534. The optic device 540 includes a high-index layer 542 and a low-index layer 546 enclosing an intermediate grading zone 544 comprising reflection surfaces whose curvature extends beyond that of the intermediate grading zone 526 in the optic device 520. Alternatively, as can be appreciated by one skilled in the relevant art, the optic device 540 may comprise reflection surfaces 544-1, 544-2, and 544-3 having greater curvature than reflection surfaces 526-1, 526-2, and 526-3, to provide the relatively shorter focal length with focal point 538.

Figure 40:
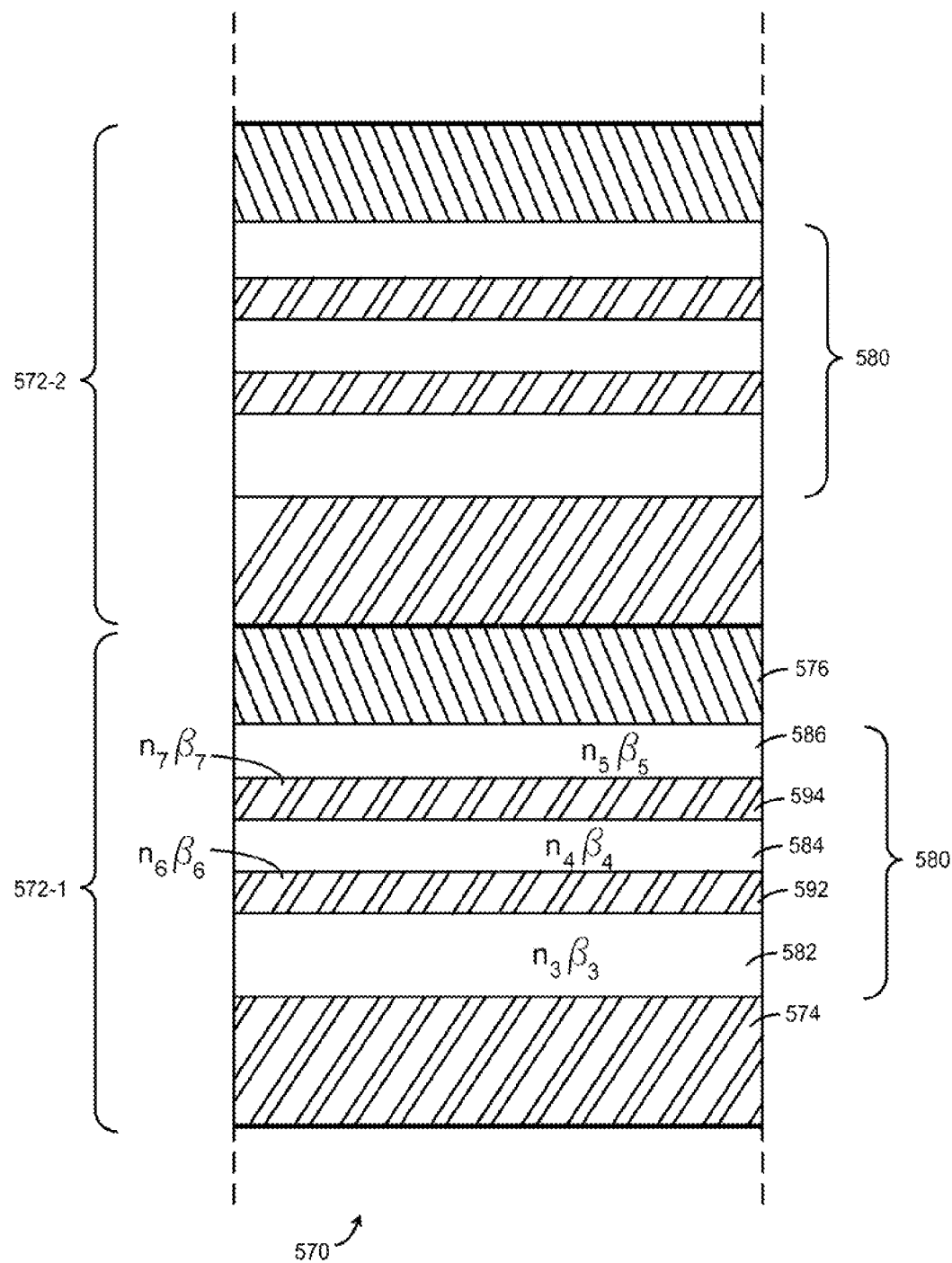
FIG. 40 is a detail cross-sectional view of an alternative exemplary embodiment of the multilayer material stack of FIG. 3, the alternative multilayer material stack having multilayer zones with a high-index layer, a low-index layer, and a plurality of grading layers with the same or different high-index layer interposed between pairs of grading layers.

Referring now to FIG. 40, an exemplary embodiment of yet another alternative multilayer material stack 570 is shown, comprising a plurality of multilayer zones, here represented by a multilayer zone 572-1 and a multilayer zone 572-2. One or more of the plurality of multilayer zones may include in each multilayer zone a high-reflectivity grading zone 580 disposed between a high-index layer 574, fabricated from a high real refractive index $n_1$ material, and a low-index layer 576, fabricated from a low real refractive index $n_2$ material. The high-reflectivity grading zone 580 comprises a first grading layer 582 having a real refractive index $n_3$ and an absorption coefficient $\beta_3$, a second grading layer 584 having a real refractive index $n_4$, an absorption coefficient $\beta_4$, and a third grading layer 586 having a real refractive index $n_5$ and an absorption coefficient $\beta_5$. In one embodiment, $n_1 > n_3 > n_4 > n_5 > n_2$ and $\beta_1 < \beta_3 < \beta_4 < \beta_5 < \beta_2$. The high-reflectivity grading zone 580 further comprises a first high-index grading layer 592 comprising material of high real refractive index $n_6$ disposed between the first grading layer 582 and the second grading layer 584, and a second high-index grading layer 594 comprising material of high real refractive index $n_7$ disposed between the second grading layer 584 and the third grading layer 586, where $n_6 > n_3$ and $n_7 > n_4$. In one embodiment, to provide optimal total internal reflection, $\beta_3 > \beta_6$ and $\beta_4 > \beta_7$.

It should be understood that the high-index material used to form the first high-index grading layer 592 and the second high-index grading layer 594 may comprise the same material used to form the high-index layer 574, or may comprise different high-index materials. The configuration of the multilayer material stack 570 provides for increased total internal reflection because layers of high real refractive index materials (i.e., relatively low photon absorption regions) are disposed in the high-reflectivity grading zone 580. This configuration can be applied to embodiments having cross-sections shown in FIGS. 2-3, FIG. 7, FIG. 9, and FIGS. 32-39, for example, to increase the open area of the respective optic device by, effectively, making alternate grading layers into transmission layers.

Figure 41:
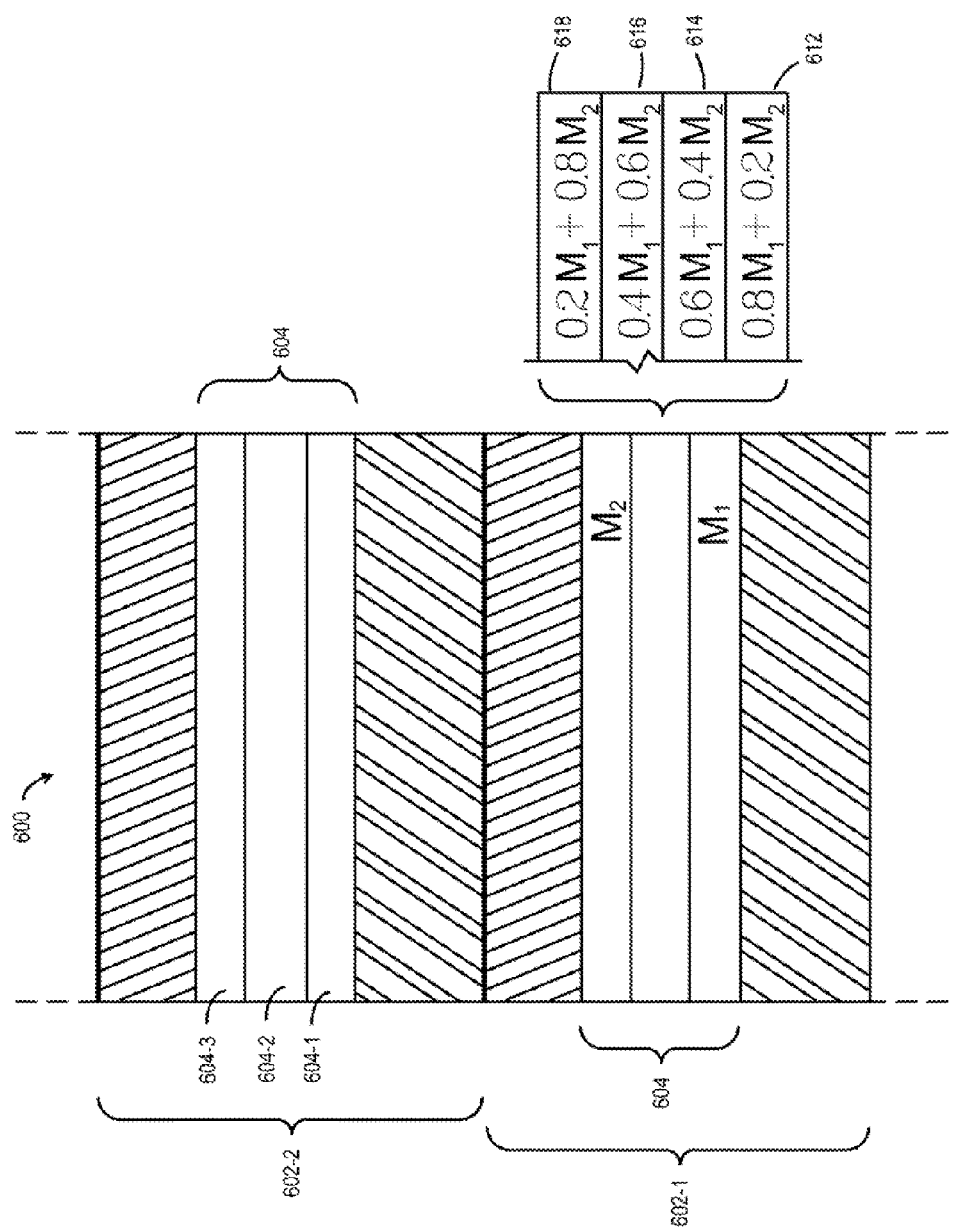
FIG. 41 is a detail cross-sectional view of an alternative exemplary embodiment of the multilayer material stack of FIG. 3, each multilayer zone having one or more composite grading layers, where each composite grading layer comprises discrete grading sublayers, each grading sublayer including two component materials, each component material having a different real refractive index.

Referring now to FIG. 41, an exemplary embodiment of an alternative multilayer material stack 600 is shown, comprising a plurality of multilayer zones, exemplified by multilayer zone 602-1 and multilayer zone 602-2. One or more of the multilayer zones may include a grading zone 604 comprising grading layers 604-1 and 604-3, and a composite grading layer 604-2. The grading layer 604-1 comprises a first component material, denoted as $M_1$, having a unique real refractive index $n_3$ and an absorption coefficient $\beta_3$, and the grading layer 604-3 comprises a second component material $M_2$ having a unique real refractive index $n_5$ and an absorption coefficient $\beta_5$. In the exemplary embodiment shown, the composite grading layer 604-2 comprises four grading sublayers 612 to 618 as shown in the detail view on the right.

In the illustrated embodiment, each of the four grading sublayers 612 to 618 comprises a different composition of both first component material $M_1$ and second component material $M_2$ so as to provide a monotonic step-wise transition in optical characteristics between the grading layer 604-1 and the grading layer 604-3. The grading sublayer 612, for example, may comprise a mixture of about 0.8 by volume of first component material $M_1$ and about 0.2 by volume of second component material $M_2$, that is, the proportion of first component material $M_1$ to second component material $M_2$ in the grading sublayer 612 is about four to one by volume. Similarly, the grading sublayer 614 may comprise about 0.6 of first component material $M_1$ and about 0.4 of second component material $M_2$, the grading sublayer 616 may comprise about 0.4 of first component material $M_1$ and about 0.6 of second component material $M_2$, and the grading sublayer 618 may comprise about 0.2 of first component material $M_1$ and about 0.8 of second component material $M_2$.

It should be understood that a multilayer zone in the multilayer zone 602-1 may comprise more than one composite grading layer. Further, it should be understood that a composite grading layer may comprise two or more grading sublayers, and that the component material mixtures in the respective grading sublayers may contain proportions of the two grading layer component materials different from the examples provided above. Moreover, it should be understood that the compositional grading may also apply to the high-index layer and the low-index layer and need not be limited to only the grading layers. In general, given a layer 'A' having component material $M_A$ and a layer 'B' having component material $M_B$, a composite layer 'C' may be fabricated between the layer 'A' and the layer 'B' and may comprise a plurality of sublayers $C_1, C_2, \ldots C_N$. Preferably, the proportion of the layer component material $M_A$ in each of the sublayers $C_1, C_2, \ldots C_N$ decreases in successive sublayers between the layer A and the layer B, and the proportion of the layer component material $M_B$ increases in successive sublayers $C_1, C_2, \ldots C_N$ between the layer A and the layer B.

Figure 42:
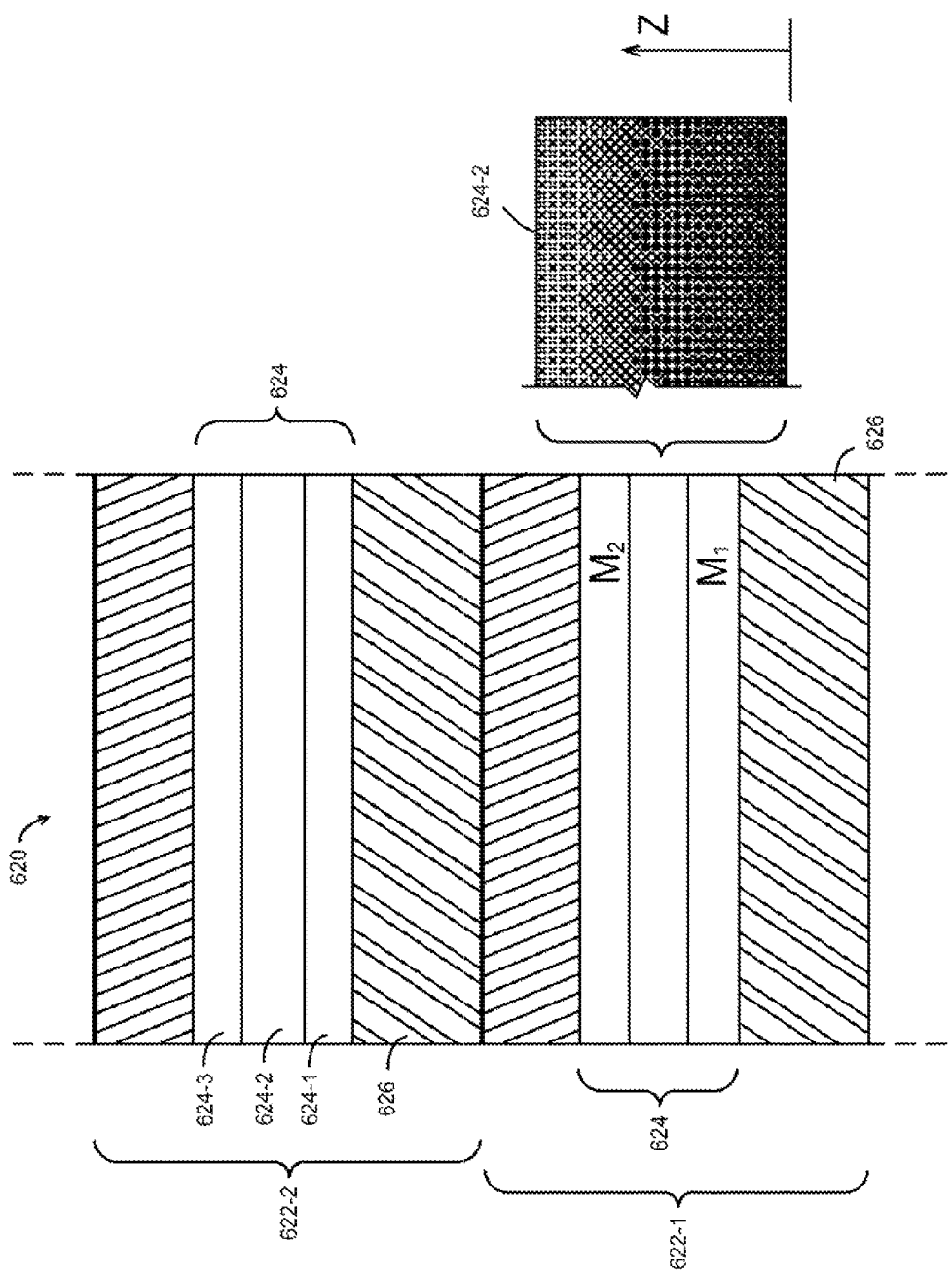
FIG. 42 is a detail cross-sectional view of an alternative exemplary embodiment of the multilayer material stack of FIG. 41, showing a grading sublayer having a non-discrete distribution of the two component materials.

There is shown in FIG. 42 a multilayer material stack 620, which is an alternative exemplary embodiment of the multilayer material stack 600. The multilayer material stack 620 comprises a plurality of multilayer zones, including a multilayer zone 622-1, and a multilayer zone 622-2 through an N-th multilayer zone (not shown). One or more of the multilayer zones may include a grading zone 624 with a composite grading layer 624-2. The composite grading layer 624-2 comprises a mixture of the first component material $M_1$ and the second component material $M_2$. The proportion of the first component material $M_1$ to the second component material $M_2$ deposited at different levels in the composite grading layer 624-2 may be specified as a function of the distance 'z' from a low-index layer 626 or from a high-index-layer (not shown). For example, the relative proportion of the component materials $M_1$ and $M_2$ at any point in the composite grading layer 624-2 may be expressed as a function of the parameter 'z' by:

$$\text{composite} = f(z)M_1 + [1 - f(z)]M_2 \qquad (13)$$

where $f(z)$ may be, for example, a linear, polynomial, or logarithmic monotonic function, specifying fractional values for the component materials $M_1$ and $M_2$. The monotonic function thus produces a smooth compositional change of the relative proportion of the component materials $M_1$ and $M_2$ between the two adjacent grading layers 624-1 and 624-3.

It can be appreciated by one skilled in the art that any of the optical devices 200, 210, 230, 260, 270, 330, 340, 360, 370, 380, and 390 described above may comprise one or more of the multilayer zone configurations described above, and further, wherein the central or core layer of an optic device may comprise either a high-index material or a low-index material, and an outer layer of the optic device may comprise either a low-index material or a high-index material. Moreover, it should be understood that, although various core configurations and optic device embodiments disclosed herein comprise circular or planar cross sections, any core shape and optic device configuration may be used to produce the redirection of UV-ray, x-ray, or gamma-ray beams radiation without departing from the scope of the invention.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited to the embodiment disclosed for carrying out this invention, but that the invention includes all embodiments falling within the scope of the intended claims. Further, the use of the terms first, second, etc. does not denote any order of importance, but rather the terms first, second, etc. are used to distinguish one element from another. Still further, the use of the phrase "at least one" means one or more of the members of a group.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An optic device comprising:
a first multilayer zone for redirecting and transmitting photons through total internal reflection including
a high-index layer of material having a first real refractive index $n_1$ and a first absorption coefficient $\beta_1$;
a low-index layer of material having a second real refractive index $n_2$ and a second absorption coefficient $\beta_2$, wherein the low-index layer of material comprises a cylindrical core having one of a curvilinear or a polygonal cross-section; and
a grading zone disposed between said high-index layer of material and said low-index layer of material, the grading zone configured to at least partially enclose said low-index layer of material, and said high-index layer of material configured to at least partially enclose said grading zone, said grading zone comprising a first grading layer having a third real refractive index $n_3$ and a third absorption coefficient $\beta_3$ such that $n_1 > n_3 > n_2$, wherein total internal reflection of photons occurs proximate an interface of the high-index layer and the grading zone and the low-index layer and the grading zone, and wherein the grading zone increases a critical angle for the total internal reflection.

2. The optic device of claim 1, wherein at least one of the values $(n_1-n_2)$, $(n_1-n_3)$, and $(n_3-n_2)$ is at a maximum.

3. The optic device of claim 2, wherein $\beta_2 > \beta_3 > \beta_1$.

4. The optic device of claim 3, wherein at least one of the values $(\beta_2-\beta_1)$, $(\beta_2-\beta_3)$, and $(\beta_3-\beta_1)$ is at a minimum.

5. The optic device of claim 1, wherein the first multilayer zone is configured to redirect X-ray photons that have an energy above 10keV.

6. The optic device of claim 1, wherein said grading zone further comprises a second grading layer formed from material having a fourth real refractive index $n_4$, and a third grading layer formed from a material having a fifth real refractive index $n_5$, wherein $n_5 > n_3$ and $n_5 > n_4$, said third grading layer disposed between said first grading layer and said second grading layer.

7. The optic device of claim 6, wherein the second grading layer comprises a fourth absorption coefficient $\beta_4$ and the third grading layer comprises a fifth absorption coefficient $\beta_5$, wherein $\beta_3 > \beta_5$ and $\beta_4 > \beta_5$.

8. The optic device of claim 1, wherein said high-index layer of material comprises a core, said core including a cylindrical portion having one of a curvilinear or a polygonal cross section, said grading zone configured to overlay at least a part of said high-index layer of material, and said low-index layer of material configured to overlay at least a part of said grading zone.

9. The optic device of claim 8, further comprising a second multilayer zone configured to enclose at least a part of said first multilayer zone.

10. The optic device of claim 8, wherein at least a portion of said low-index layer of material comprises at least one of a convex surface, a concave surface, and a saddle surface.

11. The optic device of claim 1, wherein said high-index layer of material comprises a planar shape, with said grading zone deposited on a first surface of said high-index layer, and with said low-index layer of material deposited on said grading zone.

12. The optic device of claim 11, further comprising an input face for receiving photons and an output face for transmitting photons, wherein at least part of one of said input face and output face is arcuate.

13. The optic device of claim 11, wherein said grading zone is further deposited on at least one surface of said planar shape.

14. The optic device of claim 13, wherein at least a portion of one of said high-index layer, grading zone, and low-index layer of material comprises a cylindrical surface.

15. The optic device of claim 14, wherein said cylindrical surface comprises one of a convex or a concave curvature along a longitudinal axis of said optic device.

16. The optic device of claim 1 comprising an input face for receiving input, at least a portion of said input face having one of a flat surface, a skewed surface, a convex surface, a concave surface, or a complex curved surface.

17. The optic device of claim 1, wherein said low-index layer of material comprises a planar shape, with said grading zone deposited on at least one surface of said planar shape, and with said high-index layer of material deposited on at least part of said grading zone.

18. The optic device of claim 1, wherein said grading zone further comprises a second grading layer having a plurality of grading sublayers, each said grading sublayer including a first component material and a second component material, said first component material having a fourth real refractive index $n_4$ and a fourth absorption coefficient $\beta_4$, and said second component material having a fifth real refractive index $n_5$ and a fifth absorption coefficient $\beta_5$.

19. The optic device of claim 18, wherein said fourth real refractive index $n_4$ is greater than or equal to said fifth real refractive index $n_5$ and said fifth absorption coefficient $\beta_5$ is greater than or equal to said fourth absorption coefficient $\beta_4$.

20. The optic device of claim 18, wherein each said index layer or grading sublayer comprises a composition of said first component material and said second component material in a relative proportion by volume different from a relative proportion by volume of said first component material and said second component material in an adjacent said index layer or grading sublayer.

21. The optic device of claim 1, wherein said grading zone further comprises a second grading layer including a composition of a fraction $f(z)$ by volume of a first component material $M_1$ and a fraction $[1-f(z)]$ by volume of a second component material $M_2$, said first component material $M_1$ having a fourth real refractive index $n_4$ and a fourth absorption coefficient $\beta_4$ and said second component material $M_2$ having a fifth real refractive index $n_5$ and a fifth absorption coefficient $\beta_5$, the composition given by the expression:

$$\text{composition} = f(z)M_1 + [1-f(z)]M_2.$$

22. The optic device of claim 21, wherein said function $f(z)$ comprises a linear, polynomial, or logarithmic monotonic function.

23. An optic device comprising:
one or more multilayer zones forming a first redirection section for redirecting and transmitting photons through total internal reflection, each said multilayer zone including
a cylindrical core formed from one of a high-index material and a low-index material, said high index material having a first real refractive index $n_1$ and a first absorption coefficient $\beta_1$, said low-index material having a second real refractive index $n_2$ and a second absorption coefficient $\beta_2$, the cylindrical core having one of a curvilinear or a polygonal cross-section;

a grading zone deposited on said cylindrical core, the grading zone configured to at least partially enclose the cylindrical core, said grading zone including a first grading layer having a third real refractive index $n_3$ and a third absorption coefficient $\beta_3$, wherein $n_1 > n_3 > n_2$, and at least one additional grading layer having a fourth real refractive index $n_4$ and a fourth absorption coefficient $\beta_4$ such that $n_3 > n_4$; and an outer layer deposited on said grading zone such that the outer layer at least partially encloses the grading zone, said outer layer formed from the other of said high-index material and said low-index material, wherein substantial internal reflection of photons occurs proximate an interface of the high-index material and the first grading layer, and proximate an interface of the low-index material and the at least one addition grading layer.

24. The optic device of claim 23, wherein at least a portion of one of said multilayer zones comprises one of a planar surface, a cylindrical surface, a convex surface, a concave surface, and a saddle surface.

25. The optic device of claim 23, wherein at least one of the values $(n_1-n_2)$, $(n_1-n_3)$, and $(n_3-n_2)$ is at a maximum.

26. The optic device of claim 25, wherein $\beta_2 > \beta_3 > \beta_1$.

27. The optic device of claim 26, wherein at least one of the values $(\beta_2-\beta_1)$, $(\beta_2-\beta_3)$, and $(\beta_3-\beta_1)$ is at a minimum.

28. The optic device of claim 23, further comprising a transmission section formed with said first redirection section, wherein a photon beam incident on an input face of said first redirection section is output from said transmission section.

29. The optic device of claim 28, wherein said transmission section comprises one of a cylindrical shape and a planar shape.

30. The optic device of claim 23, further comprising a second redirection section formed with said transmission section, wherein a photon beam incident on an input face of said first redirection section is output from said second redirection section.

31. The optic device of claim 30, wherein a portion of said second redirection section comprises one of a cylindrical surface, a convex surface, a concave surface, a set of multiple planar segments and a saddle surface.

32. A method for fabricating an optic device, said method comprising:

forming a high-index layer of material having a first real refractive index $n_1$ and a first absorption coefficient $\beta_1$;

forming a low-index layer of material having a second real refractive index $n_2$ smaller than said first real refractive index $n_1$ and a second absorption coefficient $\beta_2$ larger than said first absorption coefficient $\beta_1$, wherein the low-index layer of material comprises a cylindrical core having one of a curvilinear or a polygonal cross-section; and forming a grading zone between said low-index layer and said high-index layer, the grading zone configured to at least partially enclose the low-index layer of material, and the high-index layer of material configured to at least partially enclose the grading zone, said grading zone including a grading material having a third real refractive index $n_3$ and a third absorption coefficient $\beta_3$, such that $n_1 > n_3 > n_2$ and at least one addition grading material having a fourth real refractive index $n_4$ and a fourth absorption coefficient $\beta_4$ such that $n_3 > n_4$, an interface between the high-index layer and the grading zone, and the grading zone and the low index-index layer are configured to provide total internal reflection to transmit and redirect photons.

33. The method of claim 32 further comprises selecting the material for the high-index layer, the low-index layer, and the grading zone in such a way that at least one the values $(n_1-n_2)$, $(n_1-n_3)$, and $(n_3-n_2)$ is at a maximum.

34. The method of claim 32, wherein $\beta_2 > \beta_3 > \beta_1$.

35. The method of claim 34 further comprises selecting the material for the high-index layer, the low-index layer, and the grading zone in such a way that at least one the values $(\beta_2-\beta_1)$, $(\beta_2-\beta_3)$, and $(\beta_3\beta_1)$ is at a minimum.

36. The method of claim 32 wherein said grading zone comprises a plurality of grading sublayers, at least one of said sublayers is formed from a proportional mixture of a first component grading material having a fourth real refractive index $n_4$, wherein $n_1 > n_4 > n_2$ and a fourth absorption coefficient $\beta_4$, wherein $\beta_2 > \beta_4 > \beta_1$, and a second component grading material having a fifth real refractive index $n_5$, wherein $n_1 > n_5 > n_2$ and a fifth absorption coefficient $\beta_5$.

37. The method of claim 36 wherein a proportional mixture of said first component grading material to said second component grading material in a first grading sublayer is different from a proportional mixture of said first component grading material to said second component grading material in another said grading sublayer.

38. The method of claim 32 wherein said step of forming a grading zone further comprises the step of depositing a grading layer between said high-index layer of material and said low-index layer of material, said grading layer formed from a material having a refractive index that is greater than the refractive index of any adjacent grading layer and an absorption coefficient that is less than the absorption coefficient of any adjacent grading layer.

39. The method of claim 32 wherein said step of forming comprises at least one of vapor phase deposition, thermal jet spray deposition, ultrasonic jet spray deposition, and chemical plating.

* * * * *